United States Patent
Fischer et al.

(10) Patent No.: US 10,627,192 B1
(45) Date of Patent: Apr. 21, 2020

(54) DETENTED PIVOTING MOUNT FOR ATTACHING AN ACCESSORY TO A WEAPON

(71) Applicant: American Defense Manufacturing, LLC, New Berlin, WI (US)

(72) Inventors: Steve Fischer, New Berlin, WI (US); Adam Coker, New Berlin, WI (US); John Gross, New Berlin, WI (US); William Orne, III, New Berlin, WI (US)

(73) Assignee: American Defense Manufacturing, LLC, New Berlin, WI (US)

( * ) Notice: Subject to any disclaimer, the term of this patent is extended or adjusted under 35 U.S.C. 154(b) by 0 days.

(21) Appl. No.: 16/252,126

(22) Filed: Jan. 18, 2019

(51) Int. Cl.
*F41G 11/00* (2006.01)
*F41C 27/00* (2006.01)
*F16M 11/10* (2006.01)

(52) U.S. Cl.
CPC ............ *F41G 11/008* (2013.01); *F41C 27/00* (2013.01); *F41G 11/003* (2013.01); *F16M 11/10* (2013.01)

(58) Field of Classification Search
CPC .... F41G 11/003; F41G 11/005; F41G 11/007; F41G 11/008
USPC .......................................................... 42/128
See application file for complete search history.

(56) References Cited

U.S. PATENT DOCUMENTS

| | | |
|---|---|---|
| 2,115,618 A | 4/1938 | Carl |
| 2,273,878 A | 2/1942 | Magrum et al. |
| 2,385,176 A * | 9/1945 | White ................ F41G 11/008 42/128 |
| 2,529,801 A | 11/1950 | Fisk |
| 2,585,985 A | 2/1952 | Anderson |
| 2,629,175 A | 2/1953 | Merritt |
| 2,644,237 A | 7/1953 | Pachmayr |
| 2,701,963 A | 2/1955 | Balleisen et al. |
| 2,710,453 A * | 6/1955 | Beverly ............... F41G 11/008 42/128 |
| 3,178,823 A | 4/1965 | Lipski |
| 3,418,880 A | 12/1968 | Herlach |

(Continued)

OTHER PUBLICATIONS

U.S. Appl. No. 16/252,190, filed Jan. 18, 2019.
U.S. Appl. No. 16/252,236, filed Jan. 18, 2019.

*Primary Examiner* — Stephen Johnson
*Assistant Examiner* — Benjamin S Gomberg
(74) *Attorney, Agent, or Firm* — Frost Brown Todd LLC; Dennis S. Schell; Kevin C. Oschman

(57) ABSTRACT

An accessory mounting device to pivotably mount an accessory to a weapon such as a firearm provides recoil dampening and generally includes an accessory mount, a weapon attachment base, an arbor, and a detent mechanism. Advantageously, to flip or rotate the accessory mount through about 90 degrees between a first position above the base and a second position along a side of the base requires only grasping the accessory mount and rotating it from either of the positions through 90 degrees to the other position. No separate manual action to disengage any type of locking device is required, nor is any longitudinal or lateral translation of the mount involved. The function of providing stabilized, consistent location in each of the two positions, resistance to movement from each position, and manual movement of the mount that overcomes the resistance and rotates between the positions is provided by the detent mechanism.

26 Claims, 13 Drawing Sheets

(56) References Cited

U.S. PATENT DOCUMENTS

| | | | |
|---|---|---|---|
| 3,425,318 A | 2/1969 | Whitehill |
| 4,026,054 A | 5/1977 | Snyder |
| 4,558,628 A | 12/1985 | Bosshard |
| 5,425,191 A | 6/1995 | Taylor et al. |
| 5,505,118 A | 4/1996 | Amesen et al. |
| 5,513,730 A | 5/1996 | Petrovich et al. |
| 5,832,562 A | 11/1998 | Luca |
| 6,457,179 B1 | 10/2002 | Prendergast |
| 6,637,144 B2 | 10/2003 | Nelson et al. |
| 6,684,547 B2 | 2/2004 | Poff, Jr. |
| 6,874,269 B2 | 4/2005 | Chen et al. |
| 7,272,904 B2 | 9/2007 | Larue |
| 7,367,152 B2 | 5/2008 | Samson |
| 7,441,364 B2 | 10/2008 | Rogers et al. |
| 7,770,318 B2 | 8/2010 | Bentley |
| 7,814,699 B2 | 10/2010 | Storch et al. |
| 7,823,316 B2 | 11/2010 | Storch et al. |
| 7,882,654 B1 | 2/2011 | Marcum et al. |
| 7,908,782 B1 | 3/2011 | LaRue |
| 8,407,926 B2 | 4/2013 | Jung et al. |
| 8,424,234 B2 | 4/2013 | Carlson et al. |
| 8,438,773 B2 | 5/2013 | Carlson et al. |
| 8,458,946 B1 | 6/2013 | Pintsch |
| 8,505,229 B2 | 8/2013 | Savoy et al. |
| 8,510,983 B2 | 8/2013 | Larue |
| 8,578,647 B2 | 11/2013 | Storch et al. |
| 8,739,313 B2 | 6/2014 | Teetzel et al. |
| 8,793,921 B1 | 8/2014 | Tonello et al. |
| 8,935,875 B2 * | 1/2015 | Collin ............... F41G 11/003 42/124 |
| 9,038,302 B1 | 5/2015 | Pochapsky et al. |
| 9,217,621 B2 * | 12/2015 | He ..................... F41G 11/003 |
| 9,322,615 B2 | 4/2016 | Raybman |
| 9,354,022 B2 | 5/2016 | Eriksson et al. |
| 9,417,034 B1 | 8/2016 | Swan |
| 9,683,811 B1 | 6/2017 | Warensford |
| 9,689,645 B2 | 6/2017 | Bouquet |
| 9,970,722 B1 | 5/2018 | Babb |
| 10,001,345 B2 | 6/2018 | Geissele et al. |
| 10,036,613 B2 | 7/2018 | Huff |
| 10,041,765 B2 | 8/2018 | McMakin |
| 10,162,168 B2 | 12/2018 | Teetzel et al. |
| 10,222,179 B2 | 3/2019 | Smith et al. |
| 2003/0079394 A1 | 5/2003 | Poff, Jr. |
| 2004/0128900 A1 | 7/2004 | Chen et al. |
| 2006/0123686 A1 | 6/2006 | Larue |
| 2007/0033851 A1 | 2/2007 | Hochstrate et al. |
| 2007/0199224 A1 | 8/2007 | Bentley |
| 2008/0148619 A1 | 6/2008 | Rogers et al. |
| 2008/0168696 A1 | 7/2008 | Orne et al. |
| 2008/0178511 A1 | 7/2008 | Storch et al. |
| 2008/0209789 A1 | 9/2008 | Oz |
| 2009/0071056 A1 | 3/2009 | Storch et al. |
| 2010/0162611 A1 | 7/2010 | Samson et al. |
| 2011/0076095 A1 | 3/2011 | Storch et al. |
| 2011/0099881 A1 | 5/2011 | Jung et al. |
| 2011/0145981 A1 | 6/2011 | Teetzel et al. |
| 2011/0259313 A1 | 10/2011 | Reinhold |
| 2011/0296731 A1 | 12/2011 | Carlson et al. |
| 2011/0310476 A1 | 12/2011 | Russ |
| 2012/0317860 A1 | 12/2012 | Langevin et al. |
| 2013/0036650 A1 | 2/2013 | Larue |
| 2013/0145666 A1 | 6/2013 | Eriksson et al. |
| 2013/0180155 A1 | 7/2013 | He et al. |
| 2014/0137457 A1 | 5/2014 | Collin et al. |
| 2014/0163664 A1 | 6/2014 | Goldsmith |
| 2014/0327962 A1 | 11/2014 | Teetzel et al. |
| 2015/0198414 A1 | 7/2015 | Raybman |
| 2016/0223294 A1 | 8/2016 | Bouquet |
| 2016/0238346 A1 | 8/2016 | DiCarlo |
| 2017/0184375 A1 | 6/2017 | Huff |
| 2017/0219314 A1 | 8/2017 | McMakin |
| 2018/0058816 A1 | 3/2018 | Geissele et al. |
| 2018/0142981 A1 | 5/2018 | Collazo et al. |
| 2018/0347950 A1 | 12/2018 | Swan |
| 2019/0017784 A1 | 1/2019 | Smith et al. |

* cited by examiner

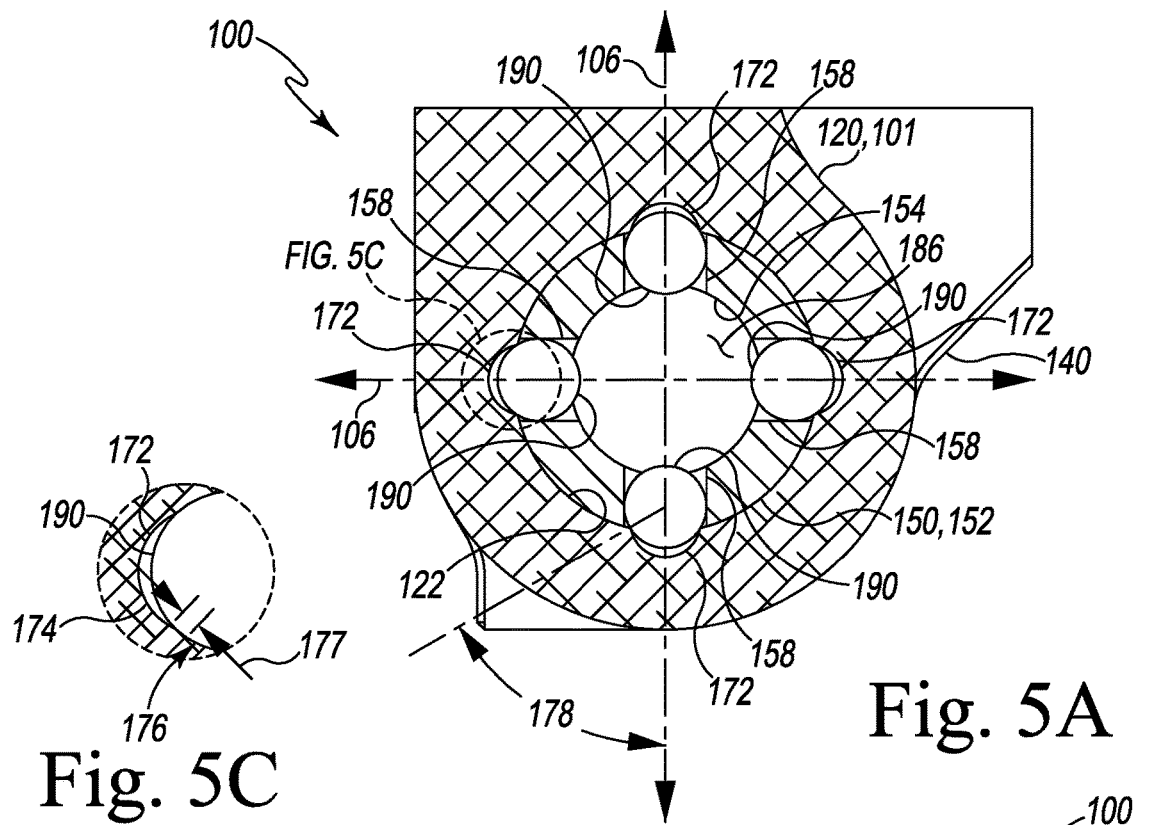
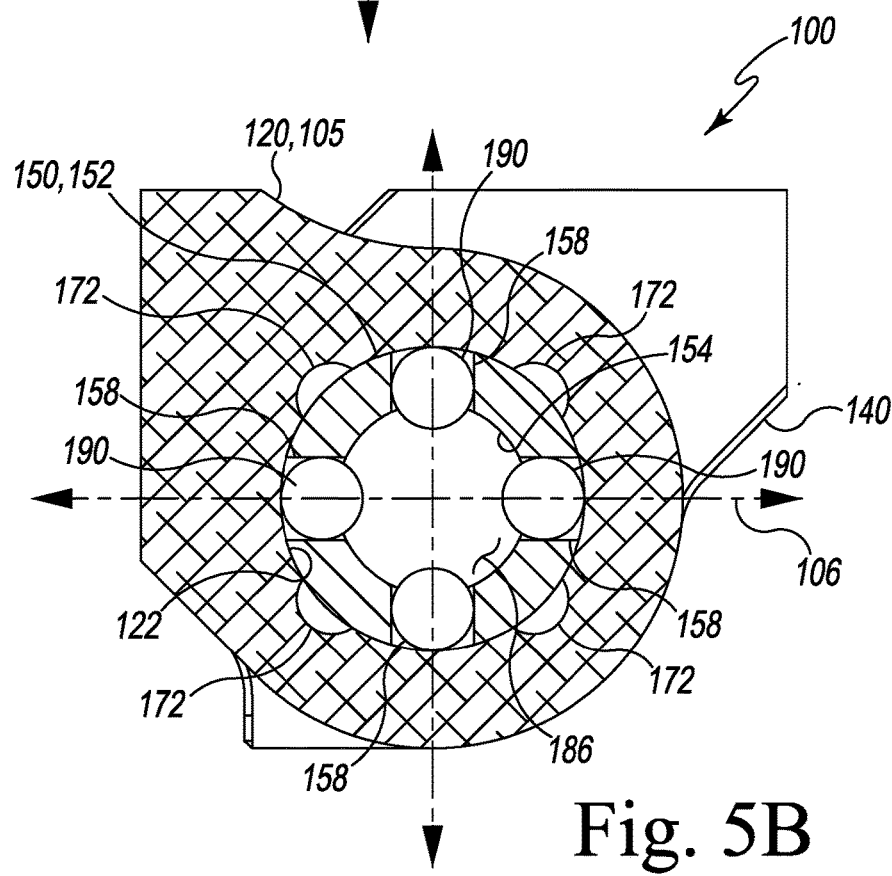

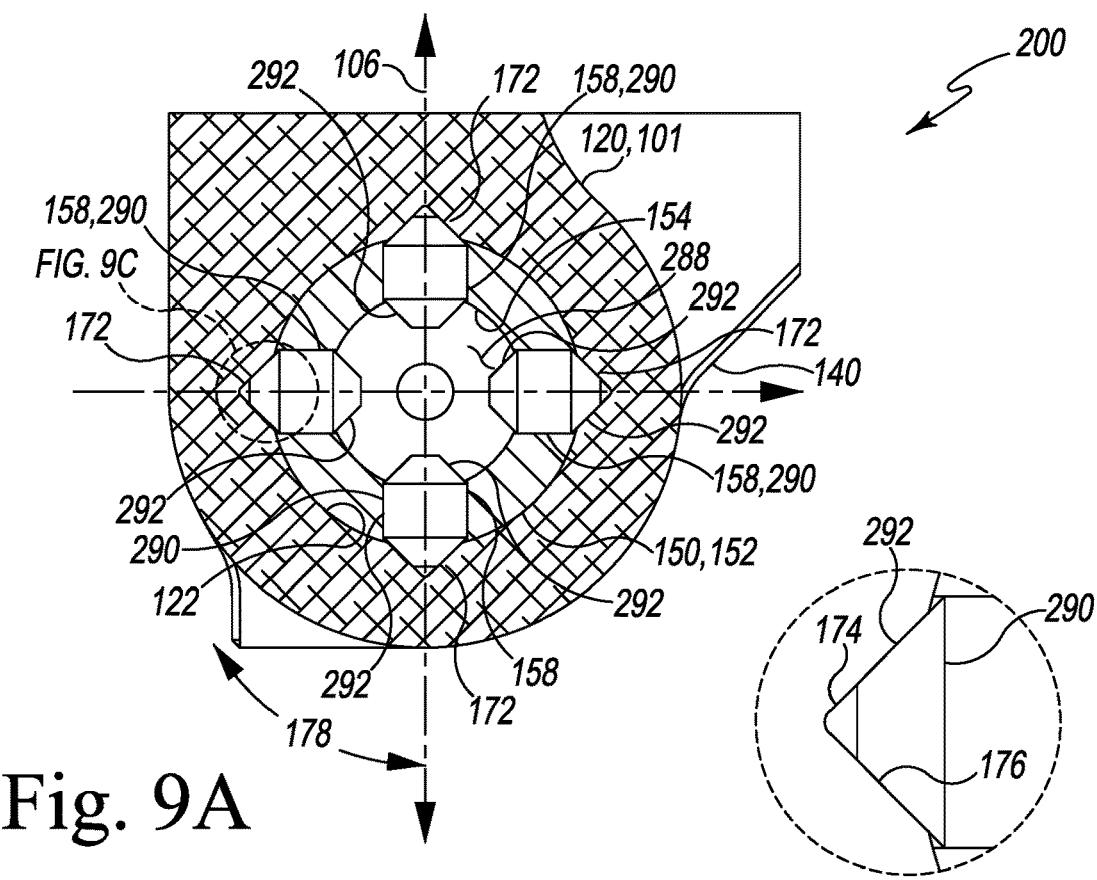
Fig. 9A
Fig. 9C
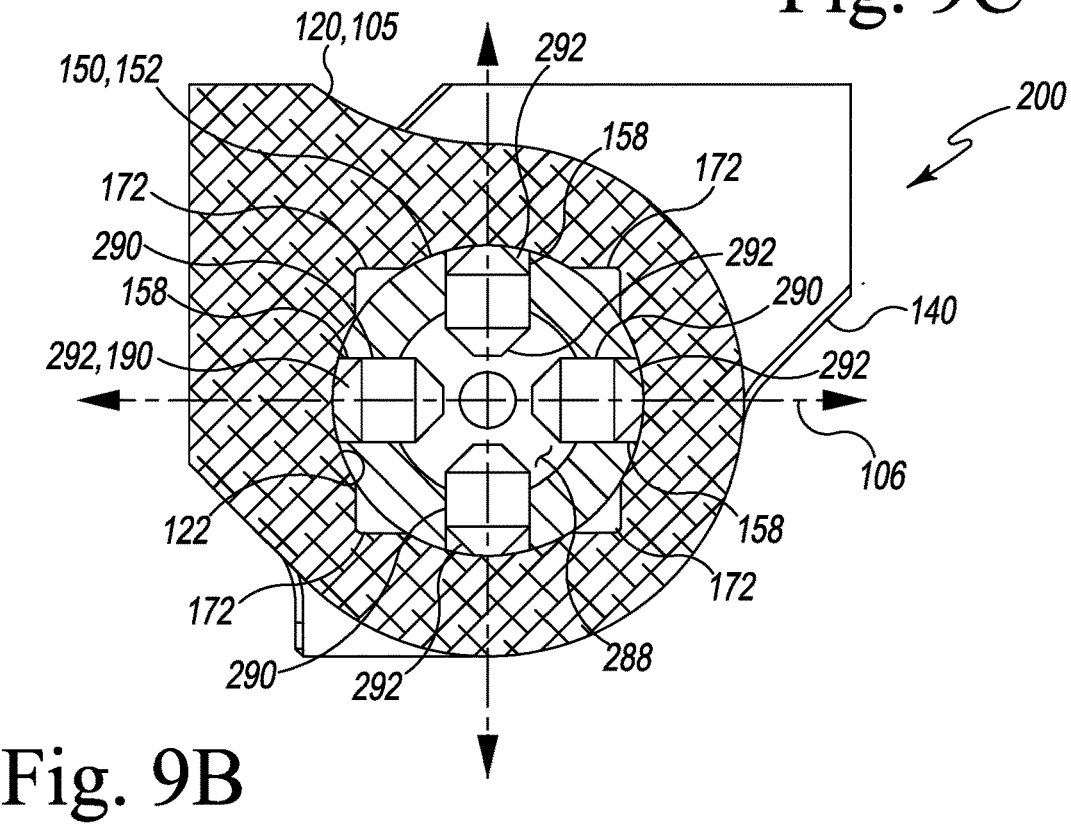
Fig. 9B

DETENTED PIVOTING MOUNT FOR ATTACHING AN ACCESSORY TO A WEAPON

TECHNICAL FIELD

Embodiments of this disclosure relate generally to mounts for attaching accessories to weapons, including firearms, and more particularly to a pivoting mount for attaching accessories to weapons.

BACKGROUND

Modern firearms and other weapons are often equipped with various accessories. For some accessories selective use is desired, which led to the earlier development of quick release mounting systems, for example, quick release accessory mounts compatible with a rail system such as MIL-STD-1913, also known as the Picatinny rail.

In some cases even more immediate selective use of an accessory is desired, for example depending on the immediate threat or other shot that presents itself, which does not lend itself to quickly mounting or releasing a particular accessory. To meet this need, various pivoting mounts for accessories have been developed that allow an accessory to be locked in a use position, and unlocked for pivoting to a non-use, storage position. Unlocking, pivoting, and relocking the accessory between the storage and the use position is generally quicker than the time required to mount an accessory to a rail system.

Accessories include for example, but are not limited to, hand-grips, illuminators, including conventional lights and lasers, and sights or sighting systems, including optical devices such as scopes, electro-optics, and magnifiers for use with another optical sight.

For firearms in particular, pivoting mounts are most often used with an optical accessory. For example, a magnifier or scope is generally preferred for a longer range shots, but an iron sight may be preferred for a shorter range shot. A pivoting mount for the magnifier or scope thus provides an advantage of very quickly pivoting the optical device into or out of the use position. For example, for an optical device, the use position is generally above the receiver and/or barrel and the non-use storage position is to the side of the receiver and/or barrel, providing a clear line of sight for an iron or other sighting device.

Existing pivoting mounts provide a quicker action between use and non-use than mounting and dismounting an accessory using a quick release rail or other system mounting system; however, existing pivoting mounts generally require actuation of a locking, unlocking, or other manual actuator before and/or after pivoting the device mount, a step or steps that can delay or otherwise encumber rapid pivoting reconfiguration of the accessory for the firearm or other weapon. As such, it was realized by the inventors of the current disclosure that improvements are needed to existing mounting devices for weapons.

For this disclosure a weapon is defined as any projectile firing device and any directed-energy device used as a weapon (e.g. highly focused to damage a target), including but not limited to firearms, compressed air guns, spring guns, bows, crossbows, laser arms, microwave emitting arms, and particle beam emitting arms.

SUMMARY

Embodiments of the present disclosure provide combinations and sub-combinations of the following features. In accordance with one embodiment of the present disclosure, an accessory attachment device for mounting an accessory to a weapon, comprising, an accessory mount having a mount sleeve defining a first cylindrical inner surface and a first attachment body for securing a weapon accessory; a base having a base sleeve defining a second cylindrical inner surface and a second attachment body for mounting the base to the weapon; an arbor defining a cylindrical outer surface, an axial bore extending axially and centrally within the arbor, and at least one radial bore defined between the cylindrical outer surface and the axial bore, the cylindrical outer surface receiving the mount sleeve and the base sleeve; and a detent mechanism including: at least one radial plunger retained by the at least one radial bore and extending at least partially into the axial bore; a biasing member located in the axial bore; an axial plunger located entirely within the axial bore, the axial plunger retained between the biasing member and the at least one radial plunger and biased by the biasing member toward the at least one radial plunger, biasing the at least one radial plunger radially outward in the at least one radial bore; at least one detent seat defined by one of the first and second cylindrical inner surface, the at least one radial plunger translating radially outward and into the at least one detent seat upon the at least one detent seat being in rotational alignment with the at least one radial bore in a first detent position of accessory mount pivoted relative to the base; and wherein at least one of the mount sleeve and the base sleeve rotate about the arbor and resists rotational movement in the first detent position in which the at least one radial plunger is biased into the at least one detent seat, providing detent interference to rotational movement, and application of rotational force to at least one of the mount sleeve and the base sleeve about the arbor overcomes the resistance to rotational movement, forcing the at least one radial plunger radially inward out of the at least one detent seat, translating the axial plunger and compressing the biasing member, thereby enabling rotational movement of the at least one of the mount sleeve and the base sleeve about the arbor.

Additionally, the first detent position can comprise a pivoting relationship between the accessory mount and the base provides a use position for the accessory relative to the weapon; and pivoting the accessory mount relative to the base can provide a non-use position for the accessory relative to the weapon.

Additionally, a second detent position of the accessory mount can pivot relative to the base providing the non-use position for the accessory relative to the weapon, another one of the at least one radial plunger translating radially outward and into the at least one detent seat upon the at least one detent seat being in rotational alignment with another one of the at least one radial bore retaining the another one of the at least one radial plunger.

Additionally and/or alternatively, a second detent position of the accessory mount can pivot relative to the base providing the non-use position for the accessory relative to the weapon, the at least one radial plunger translating radially outward and into another one of the at least one detent seat upon the another one of the at least one detent seat being in rotational alignment with the at least one radial bore.

Also, the arbor can be rotationally fixed relative to the base sleeve and the at least one detent seat is defined by the first cylindrical surface. And, the arbor can be integrally formed with one of base sleeve and the mount sleeve.

In at least one embodiment, the at least one radial plunger includes four radial plungers; and the at least one detent seat includes four detent seats; and each of the four radial plungers and four detent seats are positioned at 90 degree intervals around the arbor.

Optionally, the at least one radial plunger can comprise a ball bearing. Similarly, the at least one axial plunger can comprise a ball bearing. Alternatively, at least one axial plunger can comprise a pin having a conically chamfered end for contact with the at least one detent seat. Similarly, the at least one radial plunger can comprise a pin having a conically chamfered end for contact with the at least one axial plunger.

In at least one embodiment the base sleeve and mount sleeve are retained in axially position upon the arbor. Additionally, the base sleeve and mount sleeve can be retained in axial position upon the arbor by a head defined on a first end of the arbor and a fastener retained on a second end of the arbor.

In at least one embodiment, the biasing member can comprise a compression spring.

In at least one embodiment, the base attachment includes a quick release for coupling with a rail system of the weapon.

An embodiment of an accessory attachment device for mounting an accessory to a weapon according to the present invention comprises an accessory mount having a mount sleeve; a base having a base sleeve; an arbor having a first portion and a second portion, the arbor receiving the base sleeve on a first portion and the mount sleeve on a second portion, one of the first portion and the second portion of the arbor defining at least one radial bore; and a detent mechanism including: at least one radial plunger capable of radial translation within the at least one radial bore; a biasing member; an axial plunger biased axially by the biasing member toward the at least one radial plunger, biasing the at least one radial plunger radially outward in the at least one radial bore; at least one detent seat defined by one of the mount sleeve and base sleeve, the at least one radial plunger translating radially outward and into the at least one detent seat upon the at least one detent seat being in rotational alignment with the at least one radial bore in a first detent position of the accessory mount pivoted relative to the base; and wherein application of a rotational force of the mount sleeve relative to the base sleeve causes the at least one detent seat to apply an inward radial force on the at least one radial plunger, overcoming the biasing force of the axial plunger and biasing member, translating the at least one radial plunger radially inward and at least partially into the at least one radial bore, allowing the mount sleeve to be pivoted relative to the base sleeve.

Additionally, a second detent position of the accessory mount pivoted relative to the base can be in which another one of the at least one radial plunger translates radially outward and into the at least one detent seat upon the at least one detent seat being in rotational alignment with another one of the at least one radial bore retaining the another one of the at least one radial plunger. Optionally, at least one radial plunger can comprise a ball bearing. Also, optionally the biasing member can comprise a compression spring.

In at least one embodiment an accessory attachment device for pivotably mounting an accessory to a weapon can comprise an accessory mount having a mount sleeve; a base having a base sleeve; an arbor receiving the mount sleeve and the base sleeve, the mounting sleeve pivoting between a plurality of detented positions relative to the base sleeve; a detent mechanism requiring only an application of a pivoting force between the mounting sleeve and the base sleeve to engage and disengage the detent mechanism, the detent mechanism including: at least one radial plunger capable of radial translation and retained in one of at least one radial bore defined by one of the arbor, the mount sleeve, and the base sleeve; a biasing member providing a thrust force to the at least one radial plunger to bias the at least one radial plunger radially outward; at least one detent seat defined by one of the arbor, the mount sleeve, and base sleeve; and wherein at least one of the at least one radial plunger translates radially from the biasing into one of the at least one detent seats upon the one of the at least one detent seats being in rotational alignment with one of the at least one radial bore, thereby engaging the detent mechanism in a detent position of the mount sleeve pivoted relative to the base sleeve.

Additionally, the accessory attachment device can include an axial plunger capable of axial translation relative to the arbor, the axial plunger located between the biasing member and the at least one radial plunger, the axial plunger contacting the at least one radial plunger to bias each radially into one of the at least one detent seat.

Additionally, application of a pivoting force between the mounting sleeve and the base sleeve can enable disengagement of the detent mechanism by the at least one detent seat applying an inward radial force on the at least one radial plunger, overcoming the biasing thrust force of the biasing member, translating the at least one radial plunger radially inward out of the at least one detent seat and at least partially into the at least one radial bore, allowing the pivoting force to pivot the mount sleeve relative to the base sleeve.

The at least one radial bores can be defined by the arbor and the at least one detent seats are defined by the mount sleeve.

Additionally and/or alternatively, the accessory attachment device can further comprise a first detent position comprises a pivoting relationship between the accessory mount and the base providing a use position for the accessory relative to the weapon; and a second detent position comprising a pivoting relationship between the accessory mount the base providing a non-use position for the accessory relative to the weapon.

The number of at least one radial plungers, at least one radial bores, and at least one detent seats can be equal. Optionally, the at least one radial plunger can include four radial plungers; and the at least one detent seat can includes four detent seats; and each of the four radial plungers and four detent seats can be positioned at 90 degree intervals around the arbor.

At least one embodiment of an accessory attachment device for pivotably mounting an accessory to a weapon can comprise an accessory mount having a mount sleeve; a base having a base sleeve; an arbor receiving the mount sleeve and the base sleeve, the mounting sleeve pivotable between a plurality of detented positions relative to the base sleeve, and the arbor including a flange on at least one end; a detent mechanism retaining the mounting sleeve in each plurality of detent positions, disengagement of the detent mechanism to pivot the mounting sleeve to another of the plurality of detent positions operable by an application of a pivoting force between the mounting sleeve and the base sleeve; and a damping member positioned between a flange of the arbor and an end of one of the mount sleeve and the base sleeve, the damping member allowing movement of the mount sleeve along an axial axis of the arbor upon recoil of the weapon.

Optionally, the damping member can be positioned between the flange of the arbor and an end of the mount sleeve. The arbor can be rotationally fixed relative to the base sleeve.

The damping member can allow movement of the base sleeve along the axial axis of the arbor upon recoil of the weapon. The detent mechanism can include at least one radial plunger retained by at least one radial bore and extending at least partially into an axial bore defined within the arbor; a biasing member located in the axial bore; an axial plunger located within the axial bore, the axial plunger retained between the biasing member and the at least one radial plunger and biased by the biasing member toward the at least one radial plunger, biasing the at least one radial plunger radially outward in the at least one radial bore; at least one detent seat defined by one of the mount sleeve and the base sleeve, the at least one radial plunger translating radially outward and into the at least one detent seat upon the at least one detent seat being in rotational alignment with the at least one radial bore in a first detent position of accessory mount pivoted relative to the base.

Additionally and/or optionally, at least one of the mount sleeve and the base sleeve can rotate about the arbor and resist rotational movement in the first detent position in which the at least one radial plunger is biased into the at least one detent seat, providing detent interference to rotational movement, and application of rotational force to at least one of the mount sleeve and the base sleeve about the arbor can overcome the resistance to rotational movement, forcing the at least one radial plunger radially inward out of the at least one detent seat, translating the axial plunger and compressing the biasing member, thereby enabling rotational movement of the at least one of the mount sleeve and the base sleeve about the arbor.

In at least one embodiment an accessory attachment device for pivotably mounting an accessory to a weapon can comprise an accessory mount having a mount sleeve; a base having a base sleeve; an arbor having a flange at each end, the arbor receiving the mount sleeve and the base sleeve between the flanges, the mounting sleeve pivotable between a plurality of detented positions relative to the base sleeve; and a detent mechanism retaining the mounting sleeve relative to the base sleeve in at least one detent position, disengagement of the detent mechanism to pivot the mounting sleeve to another of the plurality of detent positions operable by only an application of a pivoting force between the mounting sleeve and the base sleeve. The damping member can be positioned between the flange of the arbor and an end of the mount sleeve.

Optionally, the damping member can allow movement of at least one of the mount sleeve and the base sleeve along the axial axis of the arbor upon recoil of the weapon.

Optionally, the arbor can be rotationally fixed relative to the base sleeve.

The detent mechanism can include at least one radial plunger retained by at least one radial bore and extending at least partially into an axial bore defined within the arbor; a biasing member located in the axial bore; an axial plunger located within the axial bore, the axial plunger retained between the biasing member and the at least one radial plunger and biased by the biasing member toward the at least one radial plunger, biasing the at least one radial plunger radially outward in the at least one radial bore; at least one detent seat defined by one of the mount sleeve and the base sleeve, the at least one radial plunger translating radially outward and into the at least one detent seat upon the at least one detent seat being in rotational alignment with the at least one radial bore in a first detent position of accessory mount pivoted relative to the base.

Additionally, at least one of the mount sleeve and the base sleeve can rotate about the arbor and resist rotational movement in the first detent position in which the at least one radial plunger is biased into the at least one detent seat, providing detent interference to rotational movement, and application of rotational force to at least one of the mount sleeve and the base sleeve about the arbor overcomes the resistance to rotational movement, forcing the at least one radial plunger radially inward out of the at least one detent seat, translating the axial plunger and compressing the biasing member, thereby enabling rotational movement of the at least one of the mount sleeve and the base sleeve about the arbor.

In at least one embodiment, an accessory attachment device for pivotably mounting an accessory to a weapon can comprising an accessory mount having a first attachment body and a mount sleeve, the first attachment body for receiving the accessory; a base having a second attachment body and a base sleeve, the second attachment body for attaching the device to the weapon; and an arbor receiving the mount sleeve and the base sleeve, the mounting sleeve pivotable relative to the base sleeve; and wherein the mount sleeve defines a face having a plurality of posts extending therefrom, the relative locations of the plurality of posts extending from the posts forming a pattern; the first attachment body defines a face defining a plurality of recesses, the plurality of recesses including a plurality of subsets of the plurality of recesses, each of the plurality of subsets matching the pattern of the plurality of posts; and the face of the mounting sleeve may be coupled to the face of the first attachment body of the accessory mount in any one of a plurality of positions for which the plurality of posts mesh with one of the plurality of subsets such that each of the plurality of posts is engaged with one of the plurality of recesses of one of the plurality of subsets.

Optionally, the plurality of posts can include at least two posts; the plurality of recesses can include at least three recesses; the plurality of recesses can form at least two of the plurality of subsets for which one of the at least three recesses is a member of two of the at least two of the plurality of subsets; and the plurality of positions can include at least two positions.

Also, the plurality of posts can includes four posts; the plurality of recesses can include four recesses; and the plurality of recesses can form two of the plurality of subsets for which two of the plurality of recesses are members of both of the two of the plurality of subsets.

Furthermore, the plurality of posts can include four posts; the plurality of recesses can include eight recesses; the plurality of recesses can form three of the plurality of subsets for which four of the plurality of recesses are each members of two of the three of the plurality of subsets; and the plurality of positions can include three positions.

Optionally, the plurality of posts can each have a non-symmetrical transverse cross-section; and the plurality of recesses can include recesses having a transverse cross-section matching the transverse cross-section of two of the plurality of posts. Optionally, the plurality of recesses can include recesses having a transverse cross-section matching the transverse cross-section of one of the plurality of posts.

Additionally, the plurality of positions an extend along a sighting axis of the weapon, thereby providing a plurality of positions to locate the accessory along the sighting axis of the weapon.

In at least one embodiment, an accessory attachment device for mounting an accessory to a weapon can comprise an accessory mount having a first attachment body and a mount member, the first attachment body for receiving the accessory; and a base having a second attachment body and a base member, the second attachment body for attaching the device to the weapon; and wherein: the mount member is coupled to the base member; the mount member defines a first component of an interlocking mesh; the first attachment body defines a plurality of second components of an interlocking mesh, at least one of the plurality of second components formed by a portion of each of two adjacent ones of the plurality of second components; and the mounting member may be coupled to the first attachment body of the accessory mount in any one of a plurality of positions for which the first component of the interlocking mesh engage with one of the plurality of second components of the interlocking mesh.

Optionally, the first component of the interlocking mesh can comprise a plurality of posts; and each of the second components of the interlocking mesh can comprise a plurality of recesses having a pattern that fixedly meshes with the first component.

Optionally the plurality of positions can extend along a sighting axis of the weapon, thereby providing a plurality of positions to locate the accessory along the sighting axis of the weapon.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 5A illustrates a sectional view of the accessory mounting device of FIG. 3B in one of the detented rotational positions illustrated in FIG. 3A, taken along section line 5A-5A in FIG. 3B;

FIG. 5B illustrates a sectional view of the accessory mounting device of FIG. 3B in a transiting rotational position between the detented rotational positions illustrated in FIG. 3A, taken along section line 5B-5B in FIG. 3B;

FIG. 5C illustrates a close up view of a portion of the sectional view of FIG. 5A showing an radial plunger positioned in a detent seat;

FIG. 9A illustrates a sectional view of the accessory mounting device of FIG. 7A in one of the detented rotational positions illustrated in FIG. 3A, taken along section line 9A-9A in FIG. 7A;

FIG. 9B illustrates a sectional view of the accessory mounting device of FIG. 7A in a transiting rotational position between the detented rotational positions illustrated in FIG. 3A, taken along section line 9B in FIG. 7A;

FIG. 9C illustrates a close up view of a portion of the sectional view of FIG. 9A showing an axial plunger position in a detent seat;

DETAILED DESCRIPTION OF THE ILLUSTRATED EMBODIMENTS

Figure 1:
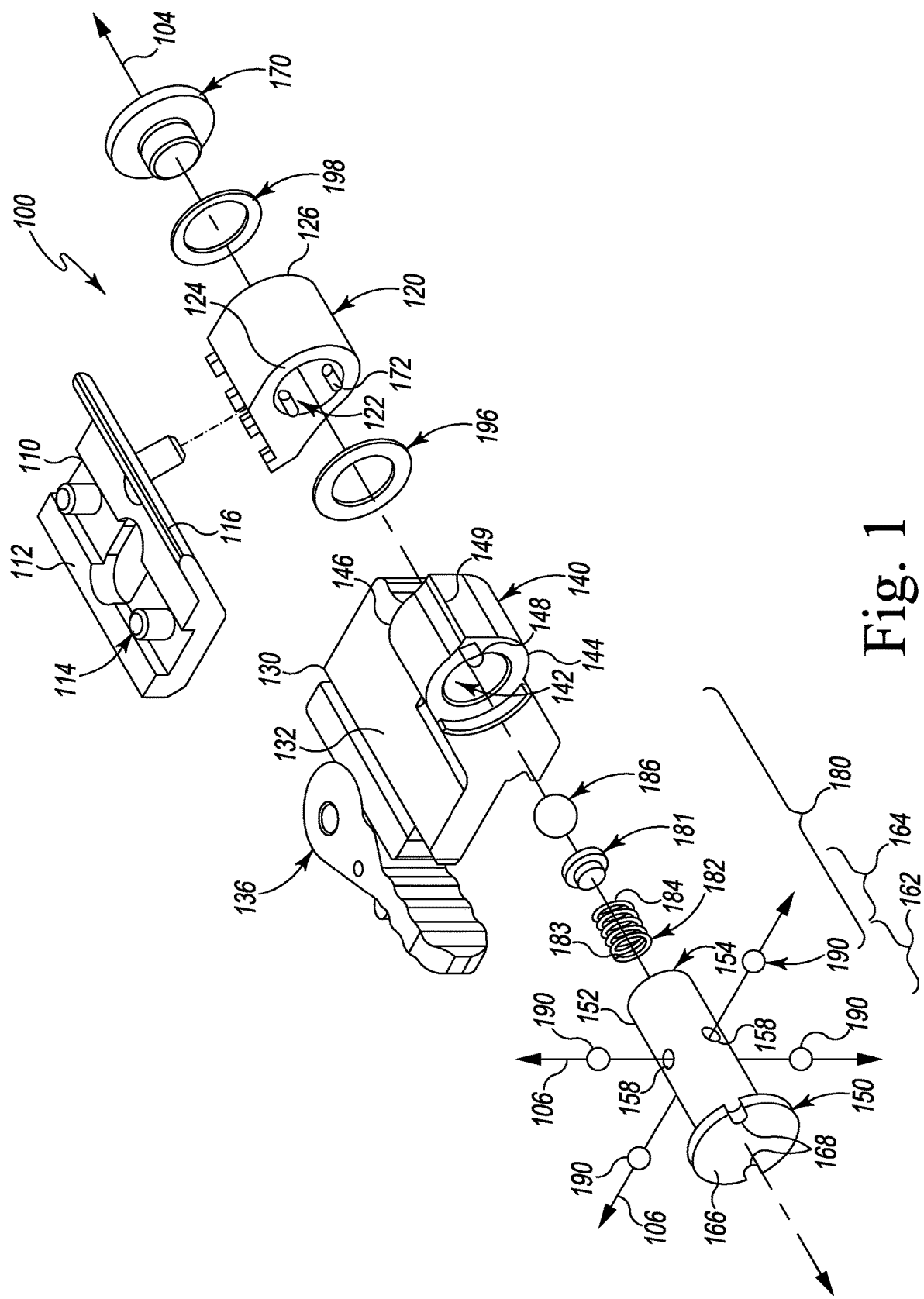
FIG. 1 illustrates an exploded view of a first exemplary embodiment of the accessory mounting device according to the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities of measurement may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Figure 2A:
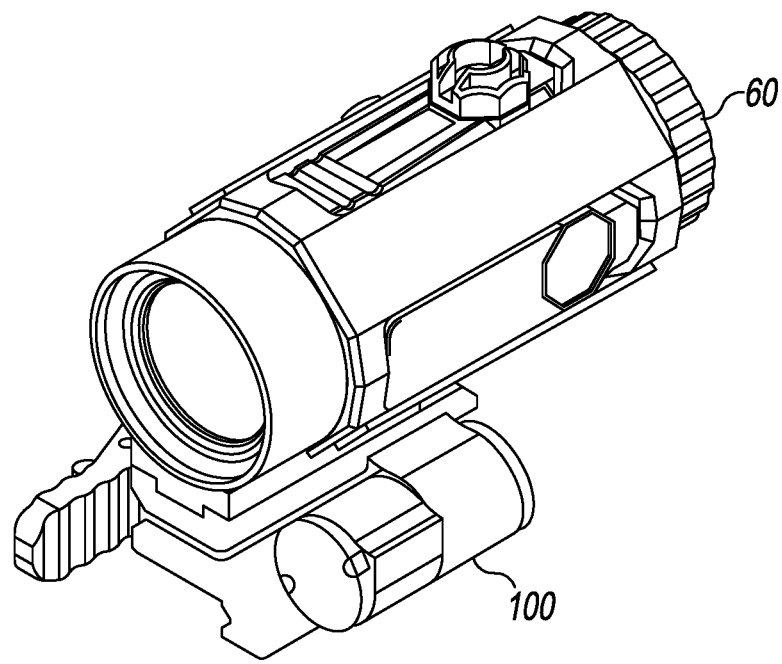
FIG. 2A illustrates an top front perspective view of the accessory mounting device of FIG. 1 mounted with an exemplary accessory.
Figure 2B:
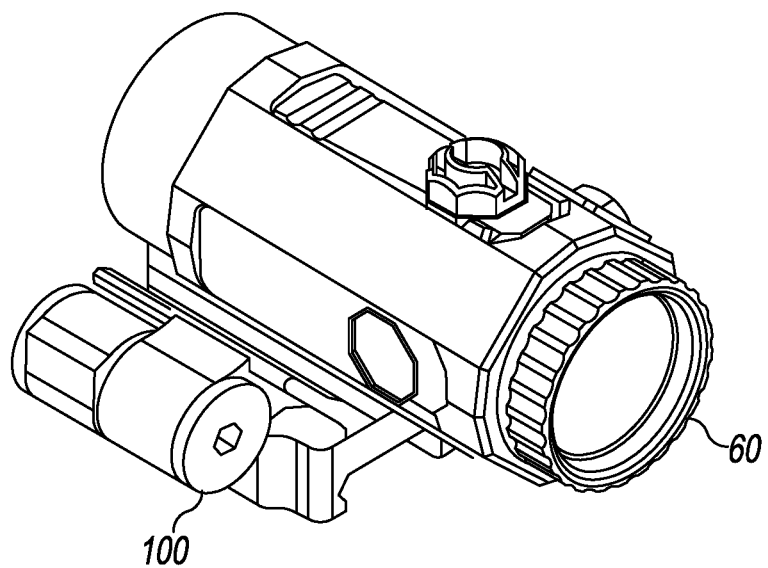
FIG. 2B illustrates an top rear perspective view of the accessory mounting device of FIG. 1 mounted with an exemplary accessory.
Figure 3A:
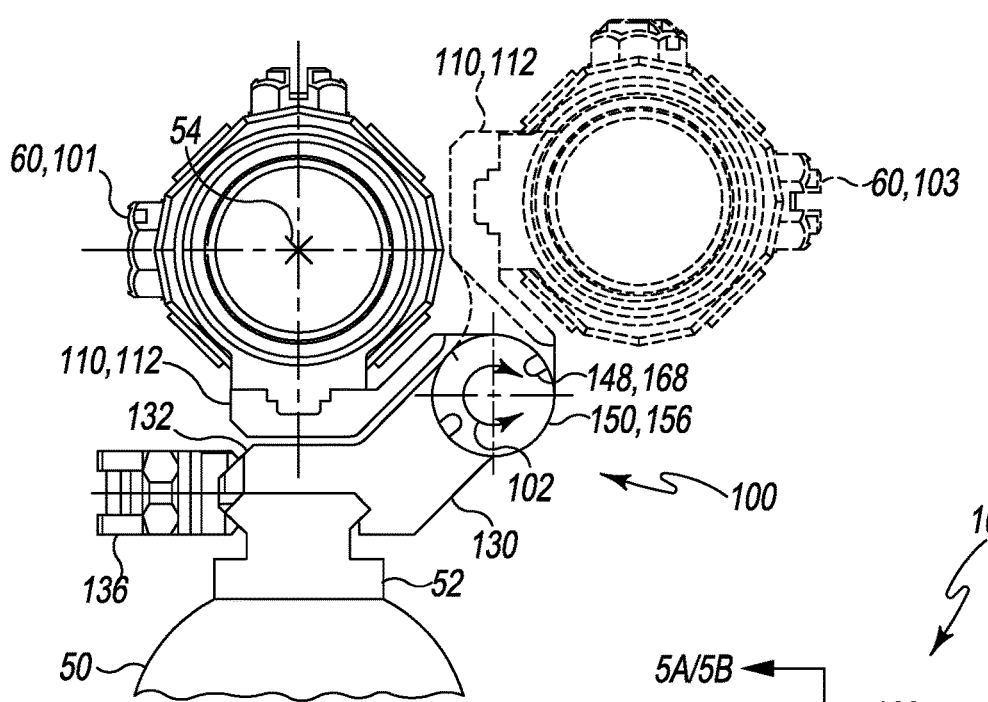
FIG. 3A illustrates an front view of the accessory mounting device of FIG. 1 mounted to an exemplary firearm and with an exemplary accessory in a use position, and alternatively illustrated pivoted to a non-use position.

Referring to FIG. 3A, an exemplary embodiment of the accessory mounting device 100 is shown mounted to an exemplary weapon 50, for example a firearm, and pivotably mounting an exemplary weapon accessory 60. FIG. 1 illustrates an exploded view of the accessory mounting device 100 and FIG. 3A illustrated an assembled front view of the accessory mounting device mounted to the weapon 50 and pivotably mounting an accessory 60. As shown in FIG. 3A, the accessory mounting device 100 advantageously provides quick, precise pivoting between a first detent position 101 in which the accessory 60 is in a position for use, for example, above a barrel and/or receiver of a firearm for sighting (also shown in FIGS. 2A and 2B), and a second detent position 103, in which the accessory is in position for non-use, for example storage, for example, to a side of the barrel and/or receiver of a firearm and out of a line of sighting for the firearm.

Figure 3B:
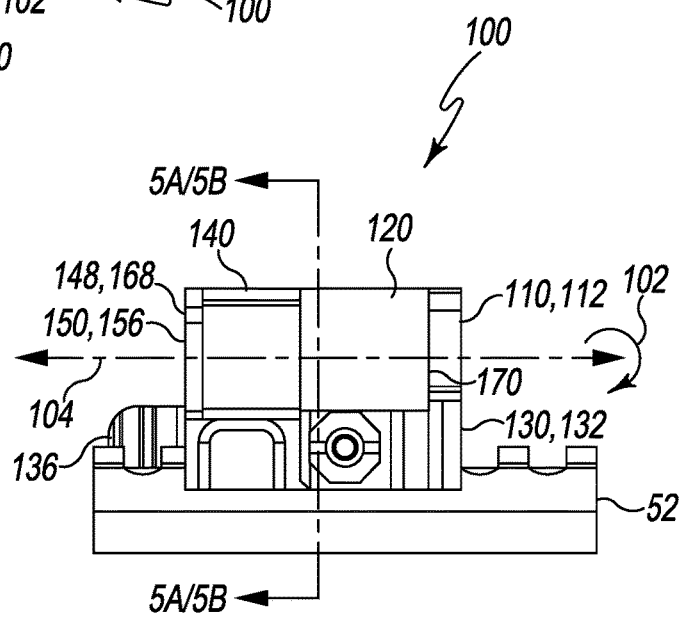
FIG. 3B illustrates a right side view of the accessory mounting device of FIG. 1.
Figure 3C:
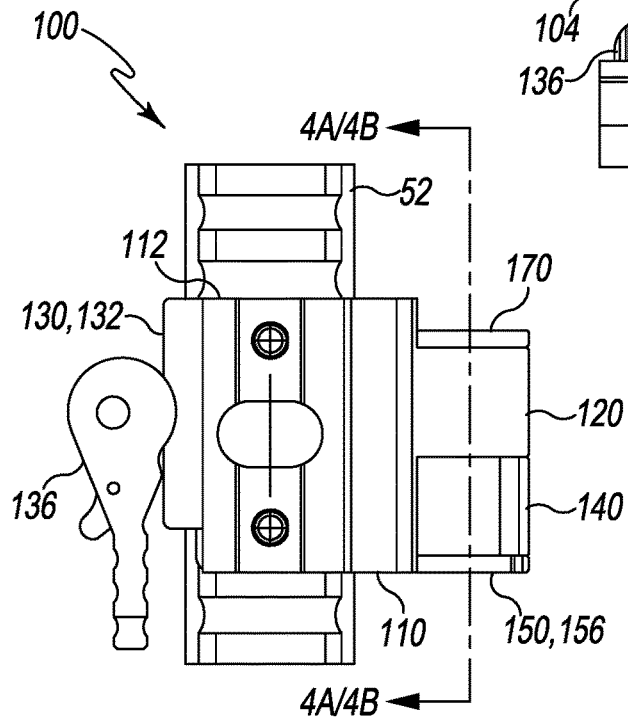
FIG. 3C illustrates a top view of the accessory mounting device of FIG. 1.

The accessory attachment device 100 generally comprises an accessory mount 110, a base 130, an arbor 150, and a detent mechanism 180. Advantageously, to flip or rotate the accessory mount 110 through about 90 degrees between the first detent position 101 above the base 130 and the second detent position 103 along a side of the base requires only grasping the accessory 60 and/or accessory mount 110 and rotating it from either of the rotational positions through 90 degrees to the other rotational position. No separate manual action to disengage any type of locking device is required. The function of providing stabilized, consistent location in each of the two positions, resistance to movement from each position, and manual movement of the mount that overcomes the resistance and rotates between the positions is provided by the detent mechanism 180 that will be discussed further below. Advantageously, in at least one embodiment a rotational axis 102 (FIGS. 3A-3B) that the accessory mount 110 pivots through, around axial axis 104 (FIGS. 1 and 3B), is parallel to the firing axis and the sighting axis 54 (FIG. 3A) of the weapon 60. Also, in addition to the detent mechanism 180 that holds the accessory mount 110 in the detent position 103 in which the accessory 60 is in a non-use position, a pair of stops 116 and 149 (FIG. 1) defined by each of the mount sleeve 120 and base sleeve 140, respectively, can come into contact as shown in position 103 of FIG. 3A to stop further pivoting of the accessory mount 120 about the base 130 at the detent position 103.

Referring to FIGS. 1 and 3A, the accessory mount 110 can include a first attachment body 112 that receives for mounting various weapon accessories, including for example, firearm sights and sighting systems. For example, fasteners 114 can be used to secure accessory 60 to the attachment body 112. The base 130 can include a second attachment body 132 for mounting the device 100 to a weapon 50 such as a firearm. For example, in at least one embodiment as shown in FIG. 3A the device 100 includes a second attachment body 132 have a rail receiver 134, including a quick release mechanism 136 to quickly secure and release the device 100 to a rail system 52 or other portion of the weapon 50. For example, the quick release mechanism can be the one described in U.S. Pat. No. 8,578,647, titled Locking Quick Release Clamp Assembly, issued Nov. 12, 2013, and U.S. Pat. No. 7,823,316, titled Adjustable Gun Rail Lock, issued Nov. 2, 2010, both assigned to American Defense Manufacturing LLC, New Berlin, Wis.

Referring to FIG. 1, each of the accessory mount 110 and the base 130 also define a sleeve 120 and 140, respectively, with a cylindrical interior surface 122, 142 for receiving a length of the arbor 150, which defines a cylindrical outer surface 152 that acts as an axle upon which at least one of the sleeves 120 and 140 rotates. The first attachment body 112 and the mount sleeve 120 of the accessory mount 110 can be integrally formed, or coupled components. Similarly, the second attachment body 132 and base sleeve 140 of base 130 can be integrally formed, or coupled components.

In the exemplary embodiment of the accessory attachment device 100, the arbor 150 includes a head 166 and an end adjacent a first portion 162 of the outer surface 152 and a threaded bore 156 (FIG. 4A) at the opposite end adjacent a second portion 164 of the outer surface. The second cylindrical inner surface 142 of the base sleeve 140 is sized to slide upon the first portion 162 of the outer surface 152 of the arbor 150 and is held in position in one direction along an axial axis 104 by the head 166. The first cylindrical inner surface 122 of the mount sleeve 120 is size to slide upon the second portion 164 of the outer surface 152 of the arbor 150 and is held in position at first end 124 by a second end 146 of the base sleeve 140 and at a second end 126 by securing an arbor nut 170 to the threaded bore 156 of the arbor. The arbor 150 may define a flange on each end to retain the sleeve 120 and 140 thereupon, by the head 166 at a first end and the arbor nut 170 at an opposite end.

Optionally, a PTFE thrust washer 196 or other friction reducing spacer or damper can be located around the arbor 150 between the mount sleeve 120 and the base sleeve 140. Also optionally, a damping member 198, for example, a wave washer or elastomeric o-ring, can be located around the arbor 150 between the second end 126 of the mount sleeve 120 and a flange formed by the arbor nut 170. The damping member 198 provides recoil dampening by allowing a limited amount of movement between the arbor 50 and the accessory mount 110, and optionally the base 130, along axial axis 104, thereby reducing the peak G-shock applied to accessory 60 upon firing recoil of the weapon 50. The damping member 198 secondarily may also reduce the tolerances required for various component surfaces for device 100, thereby reducing cost. In alternative embodiments a damping member 198 may be additionally and/or alternatively located between ends of the sleeves 120 and 140 and/or between the flange of the head 166 and the first end 144 of the base sleeve 140. Other spacers and/or friction related devices known in the art may also be included to provide smoother, precise rotational relative movement while minimizing axial and radial relative movement as well as G-shock.

In the illustrative embodiment, the arbor 150 is rotationally fixed relative to the base sleeve 140 and the mounting sleeve 120 rotates about the arbor, along rotational axis 102. The arbor 150 is fixed rotationally to the base sleeve 140 by an engagement pin 148 fixed to or integral with the base sleeve and received by a pin receiver 168 defined by the arbor head 166. Alternatively, other means known in the art to secure the arbor base sleeve 140 rotationally to the arbor 150 may be used, including a press or interference fit, adhesives, pins or fasteners located relative to the arbor and the base sleeve, and the arbor formed integrally with the base sleeve. In an alternative embodiment of the accessory attachment device 110 the base sleeve 140 rotates about the arbor 150 and the mounting sleeve 120 is rotationally fixed relative to the arbor.

Figure 4A:
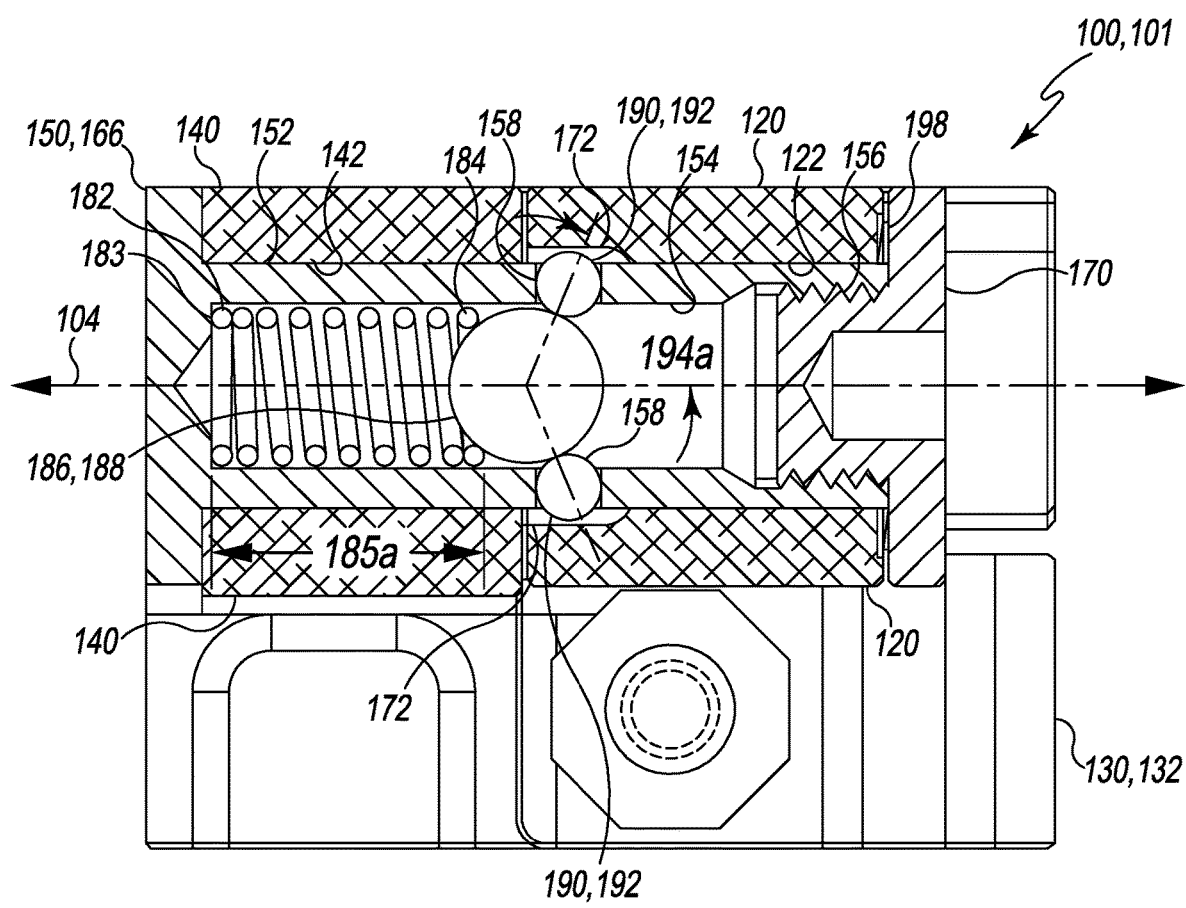
FIG. 4A illustrates a sectional view of the accessory mounting device of FIG. 3C in one of the detented rotational positions illustrated in FIG. 3A, taken along section line 4A-4A in FIG. 3C.

Referring to FIGS. 1 and 4A, in the first illustrative embodiment of the accessory attachment device 100, the arbor 150 defines an axial bore 154 from the end adjacent the second portion 164 and extending along a central axis toward but not through the head 166. The arbor 150 also defines one or more radial bores 158 through the cylindrical outer surface 152 and axial bore 154. In the illustrative embodiment, the arbor 150 defines four radial bores 158 therethrough at 90 degree intervals around the circumference of the cylindrical outer surface 152 at a location along a length of the second portion 164 and adjacent the first end 124 of the mount sleeve 120 when assembled. As shown in FIGS. 4A-5B, a radial plunger, a detent ball bearing 190 in the first illustrative embodiment, is retained by each of the radial bores 158.

Also in the illustrative embodiment, the first cylindrical inner surface 122 of the mount sleeve 120 defines four detent seats 172 adjacent the first end 124 and in axial alignment with the radial bores 158 when assembled. The detent ball bearings 190 are capable of moving radially in the radial bores 158 such that a portion of the spherical surface 192 of each detent ball bearing 190 protrudes outwardly from the respective radial bore 158 and into a respective one of the detent seats 172, as illustrated in sectional views FIGS. 4A and 5A, and an opposite side protrudes radially inwardly toward the interior of the axial bore 154 of the arbor 150, thereby fixing mount sleeve 120 relative to arbor 150.

Figure 4B:
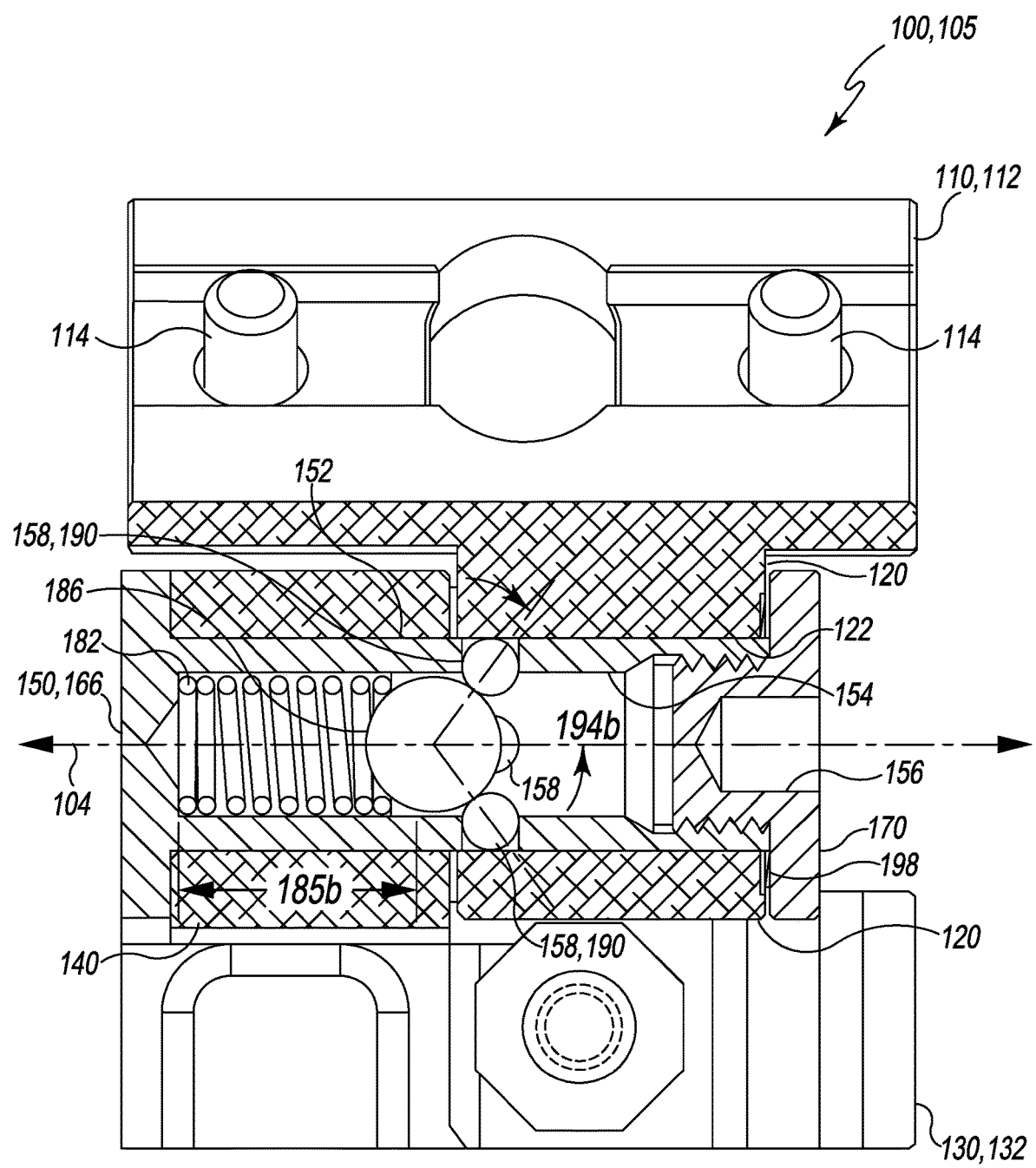
FIG. 4B illustrates a sectional view of the accessory mounting device of FIG. 3C in a transiting rotational position between the detented rotational positions illustrated in FIG. 3A, taken along section line 4B-4B in 3C.
Figure 6:
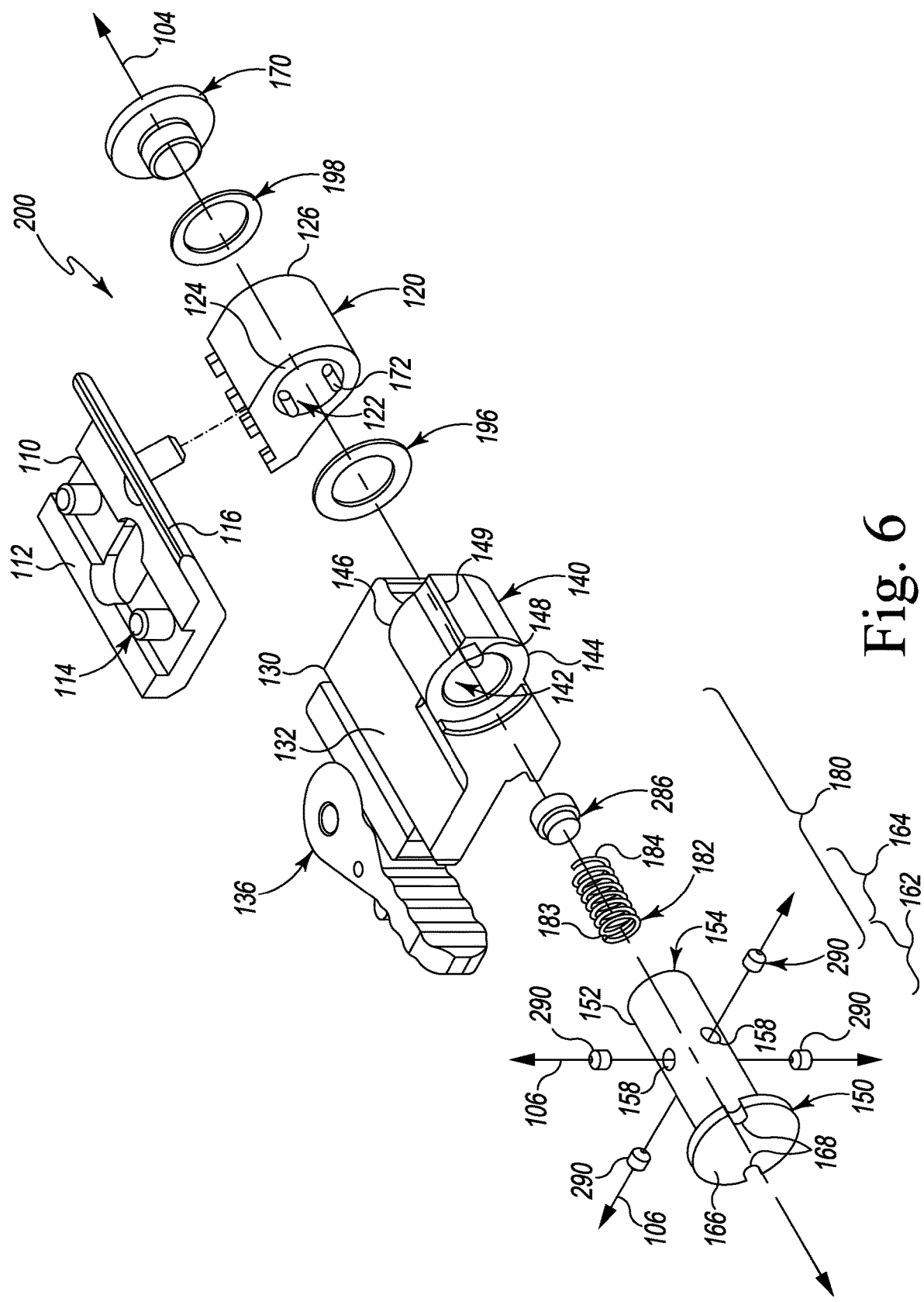
FIG. 6 illustrates an exploded view of an second exemplary embodiment of the accessory mounting device according to the present disclosure.
Figure 7A:
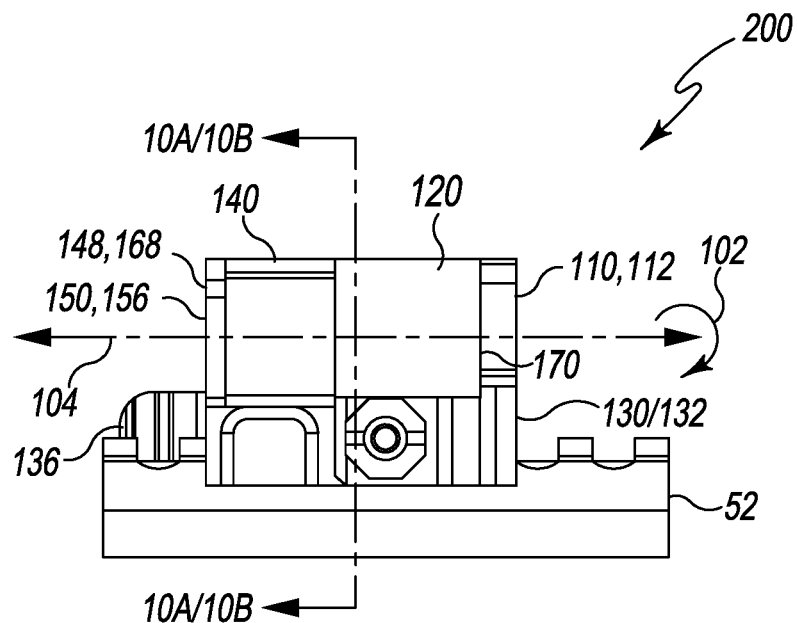
FIG. 7A illustrates a right side view of the accessory mounting device of FIG. 6.
Figure 7B:
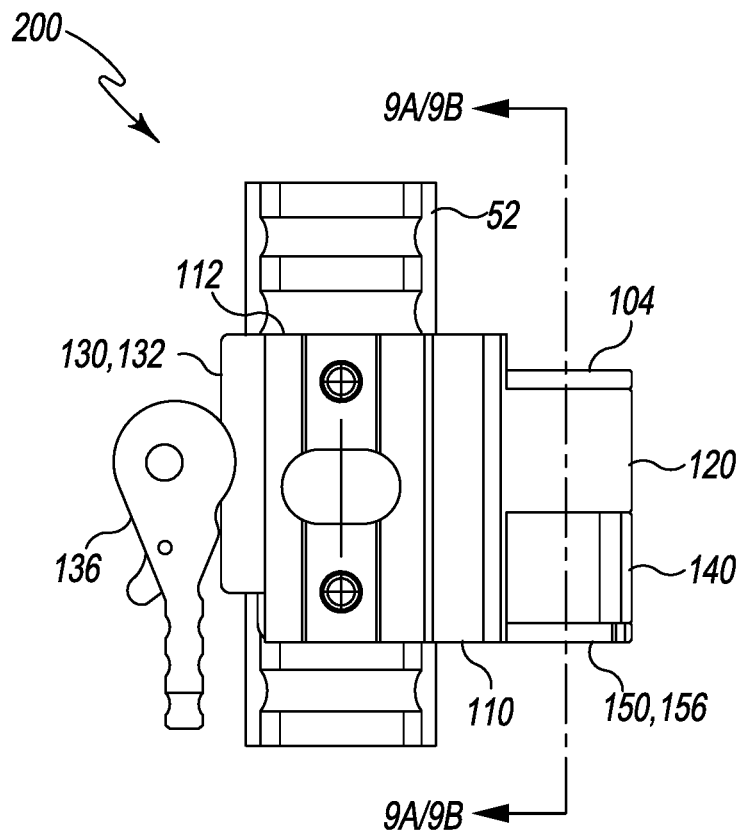
FIG. 7B illustrates a top view of the accessory mounting device of FIG. 6.
Figure 8A:
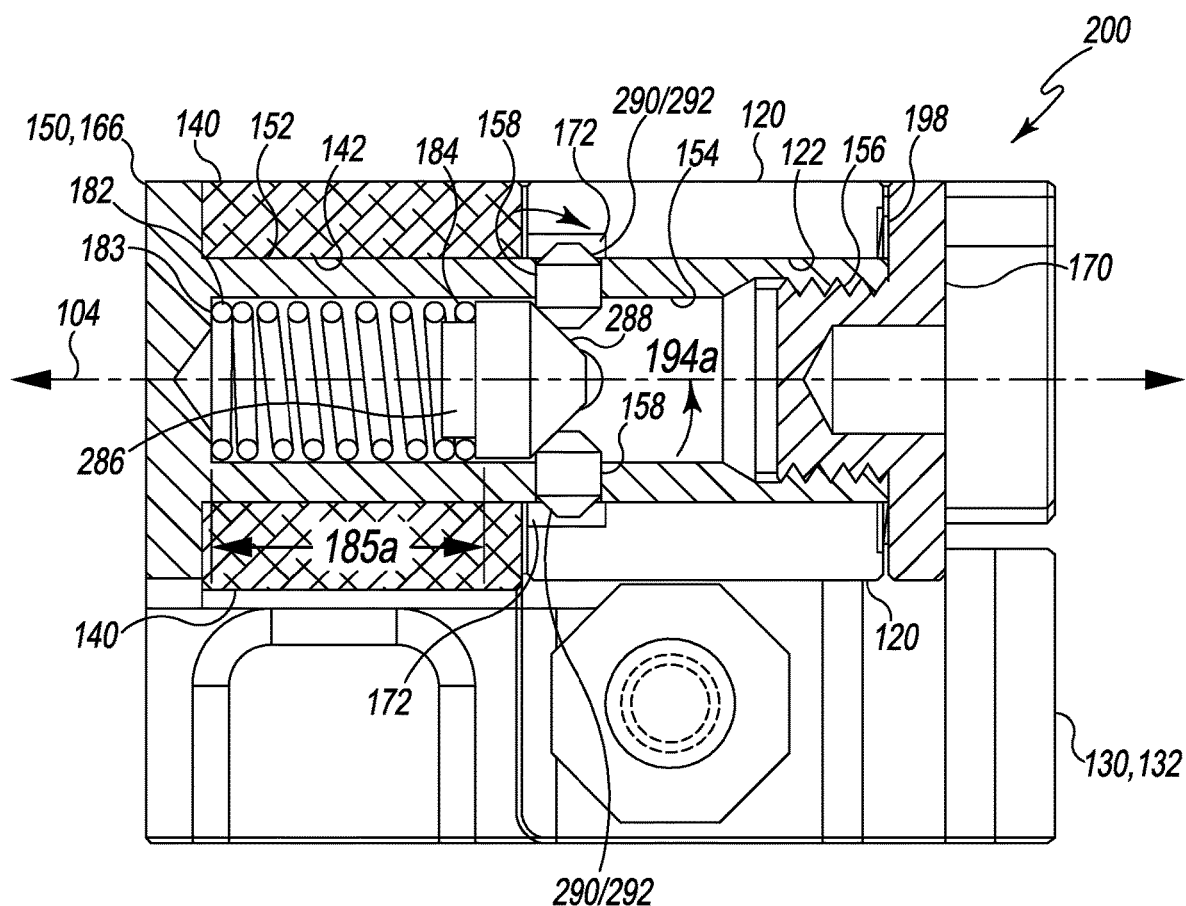
FIG. 8A illustrates a sectional view of the accessory mounting device of FIG. 7B in one of the detented rotational positions illustrated in FIG. 3A, taken along section line 8A-8A in FIG. 7B.
Figure 8B:
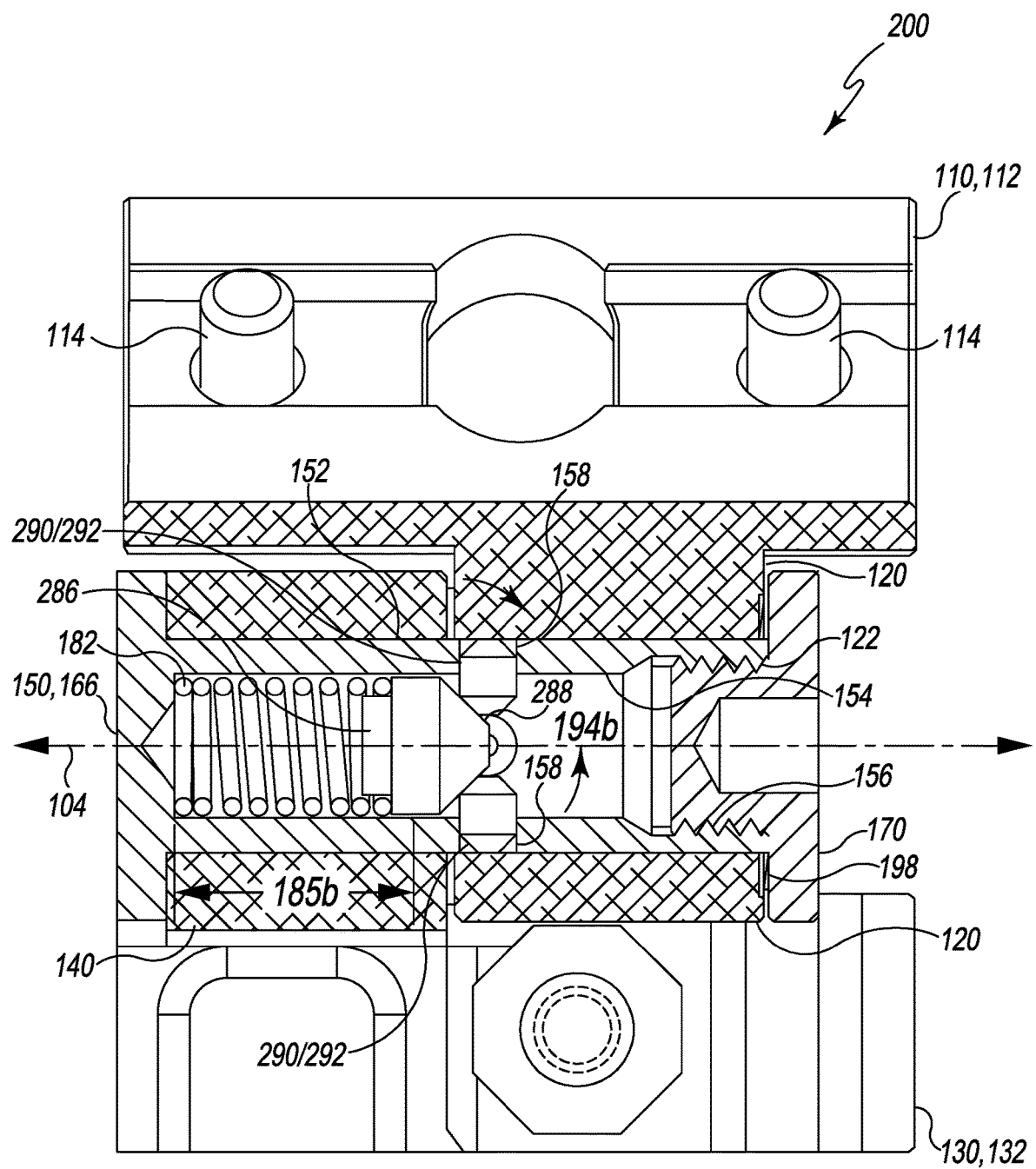
FIG. 8B illustrates a sectional view of the accessory mounting device of FIG. 7B in a transiting rotational position between one of the detented rotational positions illustrated in FIG. 3A, taken along section line 8B-8B in FIG. 7B.

Retained entirely within the axial bore 154 of the arbor 150 is an axial plunger, in the illustrated embodiment a biasing ball bearing 186 sized to approximately span the axial bore. The axial ball bearing is capable of moving laterally along the axial axis 104 of the axial bore 154, and is biased toward and in contact with the detent ball bearings 190 as shown in FIGS. 4A and 4B. More specifically, the biasing ball bearing 186 is biased axially toward the detent ball bearings 190 by a biasing member 182, which in the illustrative embodiment is a compression spring 182; however, other compression devices can be used, including for example, a compression strut, elastomeric cylinder, pressurized bellows, or other device that resists compression and provides a desired amount of axial thrust force toward biasing ball bearing 186. The compression spring 182 at a first end 183 is in contact with an end of the axial bore 154 adjacent the head 166, and a second end 184 of the compression spring is in contact with the biasing ball bearing 186. The biasing ball bearing 186 is held between the second end 184 of the compression spring 182, and the detent ball bearings 190. Portions of the spherical surface 188 of the biasing ball bearing 186 are each in contact with a portion of the spherical surface 192 of each of the detent ball bearings 190. Because the compression spring 182 is compressed and thrusts the biasing ball bearing 186 toward the detent ball bearings 190, the contact forces the detent balls held by each of the radial bores 158 outwardly against the first cylindrical inner surface 122, and if in rotational alignment, into a respective one of the detent seats 172, providing detent resistance to relative rotation about the axial axis 104, through rotational axis 102.

Sectional views FIGS. 4A and 5A, and close-up view 5C, illustrate the accessory attachment device 100 in either of the first and second detent positions 101, 103 illustrated in FIG. 3A. Referring to FIG. 5C, in the first and second detent positions 101, 103 (FIG. 3A), an annular portion of the spherical surface 192 of the detent ball bearing 190 is in contact with a tangential land 176 portion of the detent seat 172. In this relative position, the detent mechanism 180 provides resistance to rotational motion of the mount sleeve 120 and accessory mount 110 relative to the base sleeve 140 and base 130. However, with specific design aspects of the detent mechanism 180 selected with purpose as discussed below, the resistance to rotary movement provided by the detent mechanism 180 can be overcome by manually forcing rotation of the accessory mount 100 and mount sleeve 120 relative to the arbor 150.

For example, as can be seen in FIG. 5C, the circumference of the land 176 prevents the detent ball bearing 190 from resting completely within a radius 174 formed beyond the land. The detent resistance is related to a combination of area and angle of the land 176, where the land contacts the annular portion of detent ball bearing 190, the angle and moment arm of the contact between the detent ball bearing 190 and the biasing ball bearing 186, the thrust force applied on the biasing ball bearing 186 by the compression spring 182, and other factors known in the art.

For example, in the illustrated embodiment acceptable detent resistance is obtained using a compression spring 182, a 3 mm diameter detent ball bearing 190, a 7 mm diameter biasing ball bearing 186, a detent seat diameter 179 of 0.10 inches, a land width 177 of 0.01 inches, a land angle 178 between land 176 and the radial axis 106 of 60 degrees. In the detent position 101, 103, the thrust angle 194a between the axial axis 104 and the tangent point of contact of the detent ball bearing 190 and the axial ball bearing 186 is 68 degrees and the compression spring length 185a is 0.46 inches. In the transiting position 105, the thrust angle 194b between the axial axis 104 and the tangent point of contact of the detent ball bearing 190 and the axial ball bearing 186 is 53 degrees and the compression spring length 185b is 0.43 inches. Additionally, the particular characteristics of the compression spring 182 are selected in part to provide sufficient force for the detent functionality of the device 100 and to prevent dislodging of the biasing ball bearing 186 from the detent ball bearings 190 upon recoil from firing weapon 50. For example, 5-20 lbs of thrust force applied against biasing ball bearing 186 by compression spring 182 is sufficient in the illustrative embodiment to resist a recoil G-force shock acceleration of about 1,000 or more gs that may be experienced with a firearm type of weapon 50 such as a typical rifle.

As the resistance of the detent mechanism 180 is overcome by manually forcing rotation of the accessory mount 100 and mount sleeve 120 relative to the arbor 150, the rotational movement of the detent ball bearings 190 around the axial axis 104 force them against a side of lands 176, forcing the detent ball bearings radially inwardly into the radial bores 158, allowing free rotation through intermediate transiting positions 105, as illustrated in FIGS. 4B and 5B, located rotationally between the first detent position 101 and the second detent position 103. Once manual rotation of the mount sleeve 120 defining detent seats 172 relative to the arbor 150 again positions the radial bores 158 retaining the detent ball bearings 190 into alignment with the set of detent seats 172, the engagement of the various components of the detent mechanism 180 discussed above in first or second detent positions 101, 103 will again provide a detent resistance to further relative rotational movement through rotational axis 102.

The second end 184 of compression spring 182 may provide for centering of the biasing ball bearing 186 within the axial bore 154 and therefore relative to the detent ball bearings 190. For example, for the above discussed function of the detent ball bearings 190 relative to the radial bores 158 and detent seats 172, and biasing ball bearing 186 relative to the detent ball bearings 190, the desired forces and displacements may provide a design geometry for which the biasing ball bearing 186 has a diameter smaller than the diameter of the axial bore 154 within arbor 152. Therefore, the axial bore 154 may not function to guide the biasing ball bearing 186 to center; however, a portion of the spherical surface of biasing balling bearing in contact with the second end 184 of compression spring 182 provides such centering. Alternatively, an optional spring support 181 (FIG. 1) can be included, for example, between the second end 184 of compression spring 182 and biasing ball bearing 186. Advantageously, the spring support 181 can have a diameter sized for a sliding fit within the axial bore 154 and have opposite axial ends for receiving and centering each of the compression spring 182 and biasing ball bearing 186 within the axial bore.

In one alternative embodiment one or more additional sleeves may be included between the arbor 152 and first and/or second cylindrical inner surface 122 and 142 of the mount sleeve 120 and base sleeve 140, respectively, as a bearing surface for the arbor. In addition or alternatively, one or more of the first and second cylindrical inner surfaces 122 and 144 may be hardened or otherwise treated to prevent excess wear from rotation of arbor 152.

Pin 148, typically formed integrally with base sleeve 140 at first end 144, alternatively a dowel pin press fit into the base sleeve, engages one of the notches 168 to prevent rotational movement of arbor 150 through rotational axis 102 and about axial axis 104 relative to the base 130. Advantageously, pin 148 may also serve as a tamper detection device. For example, if release and/or or reattachment of arbor nut 170 requires an application of more torque on arbor 150 about axial axis 104 than the shear strength of pin 148, then if the accessory attachment device 100 is dismantled or dismantled and reassembled, pin 148 will likely shear off, indicating tampering. Additionally, base sleeve 130 may include a second pin 148 to engage the open notch 168, or the open notch 168 may be used by a manufacturing fixture to prevent rotation of arbor 150 during assembly with arbor nut 170, thereby preventing shearing of pin 148 during assembly.

The accessory mount 110, base 130, and arbor 150 typically are formed from aluminum, steel, titanium, or another rigid material. The biasing ball bearing 186 and detent ball bearings 190 typically are formed from steel, for example, stainless steel, titanium, or another rigid material, typically hardened. In generally, the material hardness of the biasing ball bearing 186 and detent ball bearings 190 should be greater than the material hardness for the mount 110, base 130, and arbor 150 so that any wear occurring is on components other than the plungers/bearings 186 and 190, for example, possible wear upon the radial bores 158 and the detent seat 172 that does not lead to premature failure of the detent and pivoting functioning. In generally, standard manufacturing tolerances and finishes known in the art can be used for the various components of the device 100.

Figure 10A:
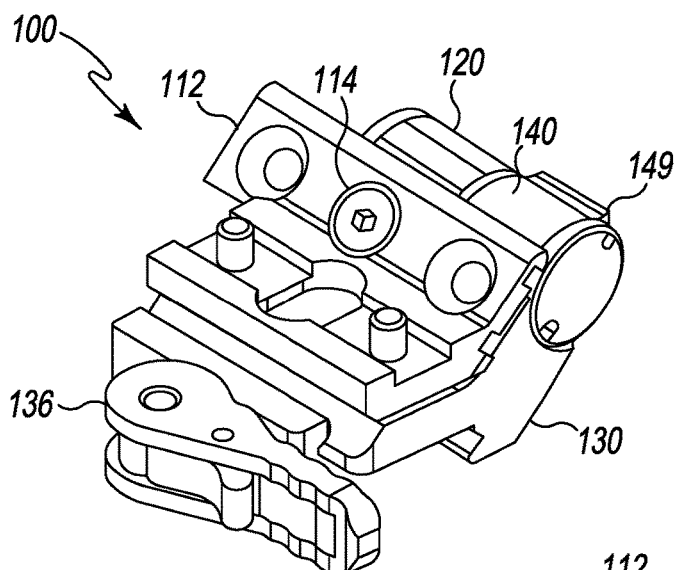
FIGS. 10A-C illustrate three selectable locations for the attachment body portion of the accessory mounting device of FIGS. 1 and 6.
Figure 10B:
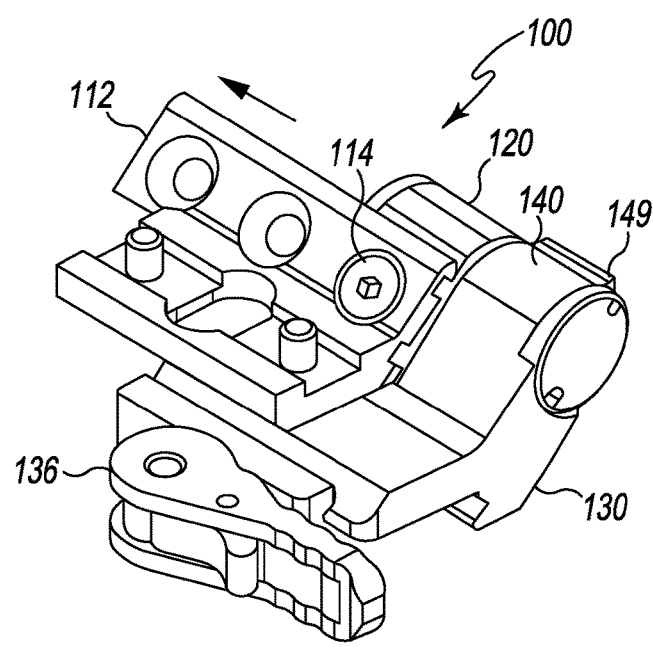
Figure 10C:
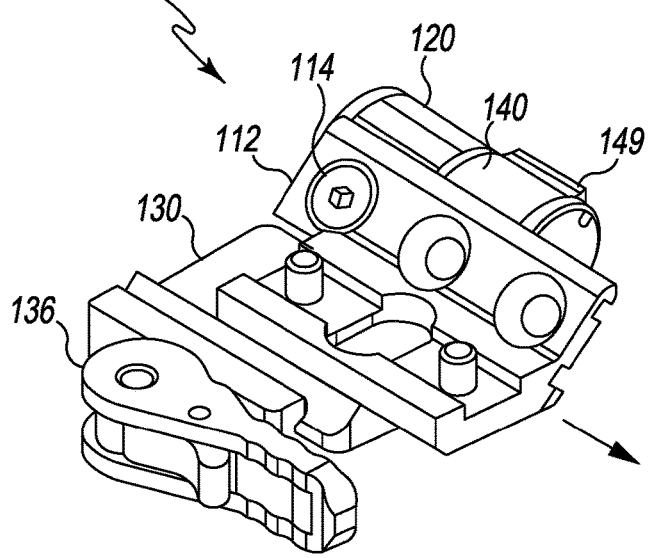

Referring to FIGS. 10A-10C, in one embodiment the first attachment body 112 is a separate component that is selectively coupled to the mount sleeve 120 in a plurality of positions along the sighting axis 54 (FIG. 3A) of the weapon 50, and thus along the axial axis 104 (FIG. 3B) of the accessory attachment device 100. For example, in an illustrative embodiment, FIG. 10A illustrates the first attachment body 112 centered above the accessory attachment device 100. FIG. 10B illustrates a forward position in which the first attachment body 112 is shifted toward a forward end of the accessory attachment device 100. FIG. 10C illustrates a rearward position in which the first attachment body 112 is shifted toward a rear end of the accessory attachment device 100. Selection of the center, forward, or rearward position accommodates a variety of accessories, for example, for optical accessories, a range of eye reliefs and optical lengths.

Figure 11:
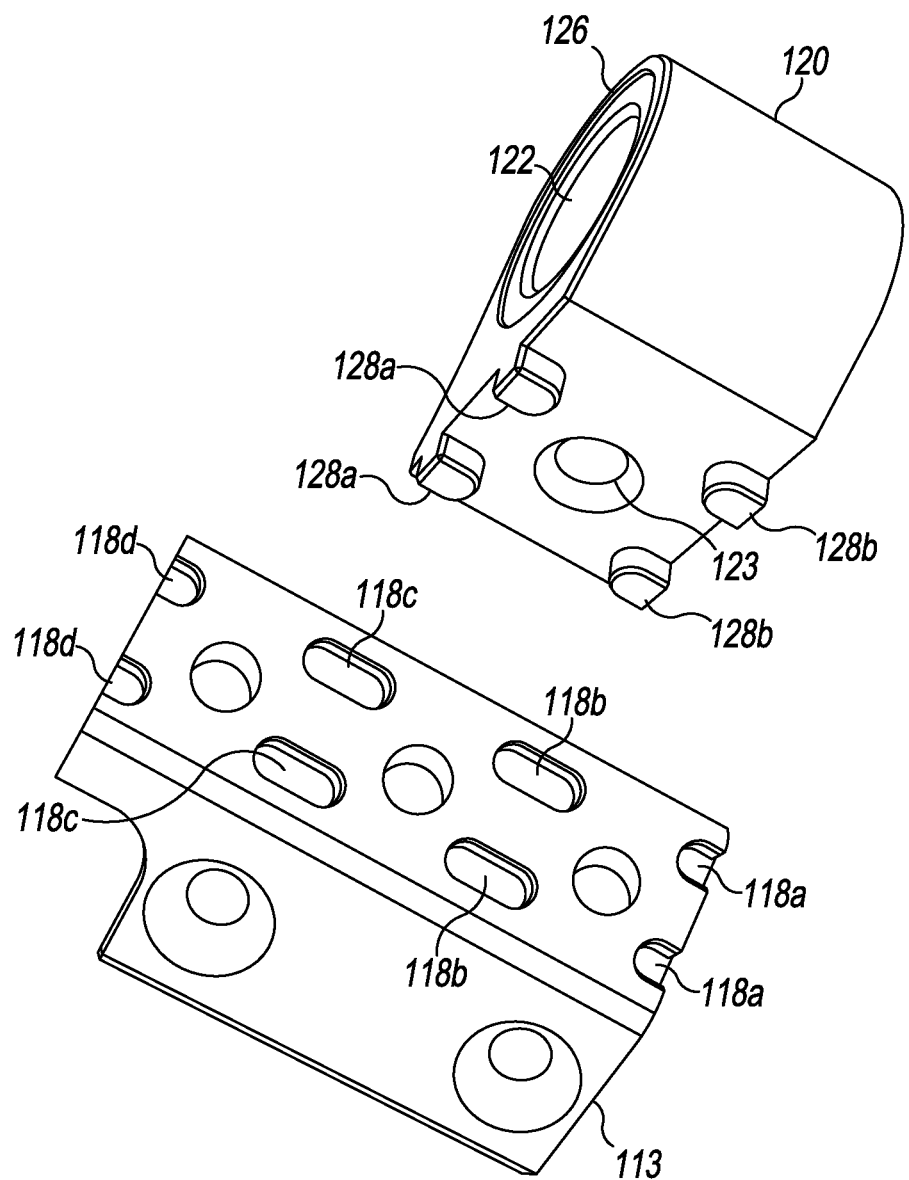
FIG. 11 illustrates an exploded view of the attachment body and mount sleeve portions of the accessory mounting device of FIGS. 1 and 6.

Referring to FIG. 11, in the illustrative embodiment, a set of lugs or posts 128a protrude from a face 121 of the mount sleeve 120 and engage with a subset of recesses 118a-d defined by a face 113 of the first attachment body 111. More specifically, posts 128a and 128b form a pattern that meshes and interlocks with portion of the recesses 118a-d. For example, in the center position shown in FIG. 10A, a pair of the posts 128a are seated in a end-half of the pair of recesses 118b that are adjacent recesses 118c, and a pair of posts 128b are seated in the end-half of the pair of recesses 118c that are adjacent recesses 118b. The interlocking mesh fit between the posts 128a-b and recesses 118b-c prevents rotational and lateral movement between attachment body 112 and mount sleeve 120, and a fastener 114 secured through body 112 and into threaded bore 123 in mount sleeve 120 secures face 113 tight against face 121, preventing disengagement.

In the forward position of the first attachment body 112 shown in FIG. 10B, the pair of posts 128a engage with the pair of recesses 118a, the pair of posts 128b engage with the end-half of the pair of recesses 118b that are adjacent recesses 118a, and the fastener 114 similarly secures the body to the mount sleeve 120. Similarly, in the rearward position of the first attachment body 112 shown in FIG. 10C, the pair of posts 128b engage with the pair of recesses 118d, the pair of posts 128a engage with the end-halves of the pair of recesses 118c that are adjacent recesses 118d, and the fastener 114 secures the body to the mount sleeve 120.

Although the illustrative embodiment includes four elongate posts 128a-b, each having a rounded end and a square end, the posts arranged in a rectangular pattern, other quantities, shapes, and patterns as are known in the art and that provide fixed engagement between the mount sleeve 120 and first attachment body 112 may also be used. Additionally, although the illustrative embodiment includes four sets of recesses 118*a-d* that provide three locations for interlocking meshing with the posts 128*a-b*, a different number of recesses and position locations can be provided. Advantageously, the illustrated embodiment has a reduced number of recesses 118*a-d* by utilizing an end-half of each of the elongate recesses 118*b* and 118*c* for one of two different positions; however, this shared recess is optional an may be absent from other embodiments.

The second illustrative embodiment of the accessory attachment device 200 shown in FIGS. 6-9C can include any or all of the features of the device 100 discussed above except that for the radial plunger, the detent ball bearings 190 are replaced with detent pins 290 having conically chamfered ends 292, and additionally or alternatively, for the axial plunger, the biasing ball bearing 182 is replaced with a biasing pin 286 having a conical chamfered end 288. However, the operation and function of the various components including plungers 290 and 293, remains the same as discussed above for the first illustrative embodiment.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

The following is a list of element numbers and at least one noun used to describe that element. The embodiments disclosed herein are not limited to these descriptions, and these element numbers can further include other words that would be understood by a person of ordinary skill reading and reviewing this disclosure in its entirety, and other words that may be used in other locations of this document.

No. Description
50 weapon
52 rail system
54 sighting axis
60 accessory
100 accessory attachment device—first embodiment
101 first detent position
102 rotational axis
103 second detent position
104 axial axis
105 transiting position
106 radial axis
107 rotational force
110 accessory mount
112 first attachment body
113 face
114 fasteners
116 stop
118*a-d* recess
120 mount sleeve
121 face
122 first cylindrical inner surface
123 threaded bore
124 first end
126 second end
128*a-b* post
130 base
132 second attachment body
134 rail receiver
136 quick lock/release mechanism
140 base sleeve
142 second cylindrical inner surface
144 first end
146 second end
148 pin
149 stop
150 arbor
152 cylindrical outer surface
154 axial bore
156 threaded bore
158 radial bore
162 first portion
164 second portion
166 head
168 pin receiver
170 arbor nut
172 detent seat
174 detent radius
176 detent land
177 land width
178 land angle
180 detent mechanism
181 spring support
182 biasing member
183 first end
184 second end
185*a* detent length
185*b* transiting compressed length
186 axial plunger
188 spherical surface
190 radial plunger
192 spherical surface
194*a* detent thrust angle
194*b* transiting thrust angle
196 PTFE washer
198 damping member
200 accessory attachment device—second embodiment
286 axial plunger
288 conical chamfer
290 radial plunger
292 conical chamfer

What is claimed is:

1. An accessory attachment device for mounting an accessory to a weapon, comprising:
an accessory mount having a mount sleeve defining a first cylindrical inner surface and a first attachment body for securing a weapon accessory;

a base having a base sleeve defining a second cylindrical inner surface and a second attachment body for mounting the base to the weapon;
an arbor defining a cylindrical outer surface, an axial bore extending axially and centrally within the arbor, and at least one radial bore defined between the cylindrical outer surface and the axial bore, the cylindrical outer surface receiving the mount sleeve and the base sleeve; and
a detent mechanism including:
   at least one radial plunger retained by the at least one radial bore and extending at least partially into the axial bore;
   a biasing member located in the axial bore;
   an axial plunger located entirely within the axial bore, the axial plunger retained between the biasing member and the at least one radial plunger and biased by the biasing member toward the at least one radial plunger, biasing the at least one radial plunger radially outward in the at least one radial bore;
   at least one detent seat defined by one of the first and second cylindrical inner surface, the at least one radial plunger translating radially outward and into the at least one detent seat upon the at least one detent seat being in rotational alignment with the at least one radial bore in a first detent position of the accessory mount pivoted relative to the base; and
wherein the at least one radial plunger and the axial plunger are arranged and configured such that:
   at least one of the mount sleeve and the base sleeve rotates about the arbor and resists rotational movement in the first detent position in which the at least one radial plunger is biased into the at least one detent seat, providing detent interference to rotational movement, and
   upon application of rotational force to the at least one of the mount sleeve and the base sleeve about the arbor, the detent mechanism is directly operable to overcome the resistance to rotational movement by forcing the at least one radial plunger radially inward out of the at least one detent seat and against the axial plunger, translating the axial plunger and compressing the biasing member, thereby enabling rotational movement of the at least one of the mount sleeve and the base sleeve about the arbor.

2. The accessory attachment device of claim 1, wherein:
the first rotational detent position of the accessory mount relative to the base provides a use position for the accessory relative to the weapon; and
pivoting the accessory mount relative to the base provides a non-use position for the accessory relative to the weapon.

3. The accessory attachment device of claim 2, comprising a second rotational detent position of the accessory mount pivoted relative to the base providing the non-use position for the accessory relative to the weapon, another one of the at least one radial plunger translating radially outward and into the at least one detent seat upon the at least one detent seat being in rotational alignment with another one of the at least one radial bore retaining the another one of the at least one radial plunger.

4. The accessory attachment device of claim 2, comprising a second rotational detent position of the accessory mount pivoted relative to the base providing the non-use position for the accessory relative to the weapon, the at least one radial plunger translating radially outward and into another one of the at least one detent seat upon the another one of the at least one detent seat being in rotational alignment with the at least one radial bore.

5. The accessory attachment of claim 1, wherein the arbor is rotationally fixed relative to the base sleeve and the at least one detent seat is defined by the first cylindrical surface.

6. The accessory attachment of claim 1, wherein the arbor is integrally formed with one of base sleeve and the mount sleeve.

7. The accessory attachment device of claim 1, wherein:
the at least one radial plunger includes four radial plungers; and
the at least one detent seat includes four detent seats; and
wherein each of the four radial plungers and four detent seats are positioned at 90 degree intervals around the arbor.

8. The accessory attachment device of claim 1, wherein the at least one radial plunger comprises a ball bearing.

9. The accessory attachment device of claim 1, wherein the at least one axial plunger comprises a ball bearing.

10. The accessory attachment of claim 1, wherein the at least one axial plunger comprises a pin having a conical chamfer for contact with the at least one radial plunger.

11. The accessory attachment of claim 1, wherein the at least one radial plunger comprises a pin having a conically chamfered end for contact with the at least one axial plunger.

12. The accessory attachment of claim 1, wherein the base sleeve and mount sleeve are retained in an axial position upon the arbor.

13. The accessory attachment of claim 12, wherein the base sleeve and mount sleeve are retained in the axial position upon the arbor by a head defined on a first end of the arbor and a fastener retained on a second end of the arbor.

14. The accessory attachment of claim 1, wherein the biasing member comprises a compression spring.

15. The accessory attachment of claim 1, wherein the base attachment includes a quick release mechanism for coupling with a rail system of the weapon.

16. An accessory attachment device for mounting an accessory to a weapon, comprising:
an accessory mount having a mount sleeve;
a base having a base sleeve;
an arbor having a first portion and a second portion, the arbor receiving the base sleeve on the first portion and the mount sleeve on the second portion, one of the first portion and the second portion of the arbor defining at least one radial bore; and
a detent mechanism including:
   at least one radial plunger capable of radial translation within the at least one radial bore;
   a biasing member;
   an axial plunger biased axially by the biasing member toward the at least one radial plunger, biasing the at least one radial plunger radially outward in the at least one radial bore;
   at least one detent seat defined by one of the mount sleeve and base sleeve, the at least one radial plunger translating radially outward and into the at least one detent seat upon the at least one detent seat being in rotational alignment with the at least one radial bore in a first detent position of the accessory mount pivoted relative to the base; and
wherein the at least one radial plunger and the axial plunger are arranged and configured so that the detent mechanism is directly operable in response to a manual application of a rotational force of the mount sleeve relative to the base sleeve to cause the at least one detent seat to apply an inward radial force on the at least one radial plunger, translating the at least one radial plunger radially inward against the axial plunger and at least partially into the at least one radial bore, translating the axial plunger toward the biasing member, overcoming the bias of the axial plunger and biasing member, and allowing the mount sleeve to be pivoted relative to the base sleeve.

17. The accessory attachment device of claim 16, comprising a second detent position of the accessory mount pivoted relative to the base in which another one of the at least one radial plunger translates radially outward and into the at least one detent seat upon the at least one detent seat being in rotational alignment with another one of the at least one radial bore retaining the another one of the at least one radial plunger.

18. The accessory attachment device of claim 16, wherein the at least one radial plunger comprises a ball bearing.

19. The accessory attachment device of claim 16, wherein the biasing member comprises a compression spring.

20. An accessory attachment device for pivotably mounting an accessory to a weapon, comprising:
- an accessory mount having a mount sleeve;
- a base having a base sleeve;
- an arbor receiving the mount sleeve and the base sleeve, the mounting sleeve pivoting between a plurality of detented positions relative to the base sleeve;
- a detent mechanism arranged and configured to be directly operable in response to only an application of a pivoting force between the mounting sleeve and the base sleeve to engage and disengage the detent mechanism, the detent mechanism including:
- at least one radial plunger capable of radial translation and retained in one of at least one radial bore defined by one of the arbor, the mount sleeve, and the base sleeve;
- a biasing member providing a thrust force to the at least one radial plunger to bias the at least one radial plunger radially outward;
- at least one detent seat defined by one of the arbor, the mount sleeve, and base sleeve; and
- wherein at least one of the at least one radial plunger translates radially from the bias of the biasing member into one of the at least one detent seats upon the one of the at least one detent seats being in rotational alignment with one of the at least one radial bore, thereby engaging the detent mechanism in a detent position of the mount sleeve pivoted relative to the base sleeve.

21. The accessory attachment device of claim 20, comprising an axial plunger capable of axial translation relative to the arbor, the axial plunger located between the biasing member and the at least one radial plunger, the axial plunger contacting the at least one radial plunger to bias the at least one radial plunger radially into one of the at least one detent seat.

22. The accessory attachment device of claim 20, wherein application of a pivoting force between the mounting sleeve and the base sleeve enables disengagement of the detent mechanism by the at least one detent seat applying an inward radial force on the at least one radial plunger, overcoming the biasing thrust force of the biasing member, translating the at least one radial plunger radially inward out of the at least one detent seat and at least partially into the at least one radial bore, allowing the pivoting force to pivot the mount sleeve relative to the base sleeve.

23. The accessory attachment device of claim 20, wherein the at least one radial bore is defined by the arbor and the at least one detent seat is defined by the mount sleeve.

24. The accessory attachment device of claim 20, further comprising:
- a first rotational detent position of the accessory mount relative to the base provides a use position for the accessory relative to the weapon; and
- a second rotational detent position of the accessory mount relative to the base provides a non-use position for the accessory relative to the weapon.

25. The accessory attachment device of claim 20, wherein a number of the at least one radial plunger, the at least one radial bore, and the at least one detent seat are equal.

26. The accessory attachment device of claim 20, wherein:
- the at least one radial plunger includes four radial plungers; and
- the at least one detent seat includes four detent seats; and
- wherein each of the four radial plungers and four detent seats are positioned at 90 degree intervals around the arbor.

* * * * *